Aug. 25, 1959 W. R. WALTERS 2,900,745
APPARATUS FOR AND IN METHOD OF CONDITIONING RAILWAY BALLAST
Filed May 1, 1953 11 Sheets-Sheet 6
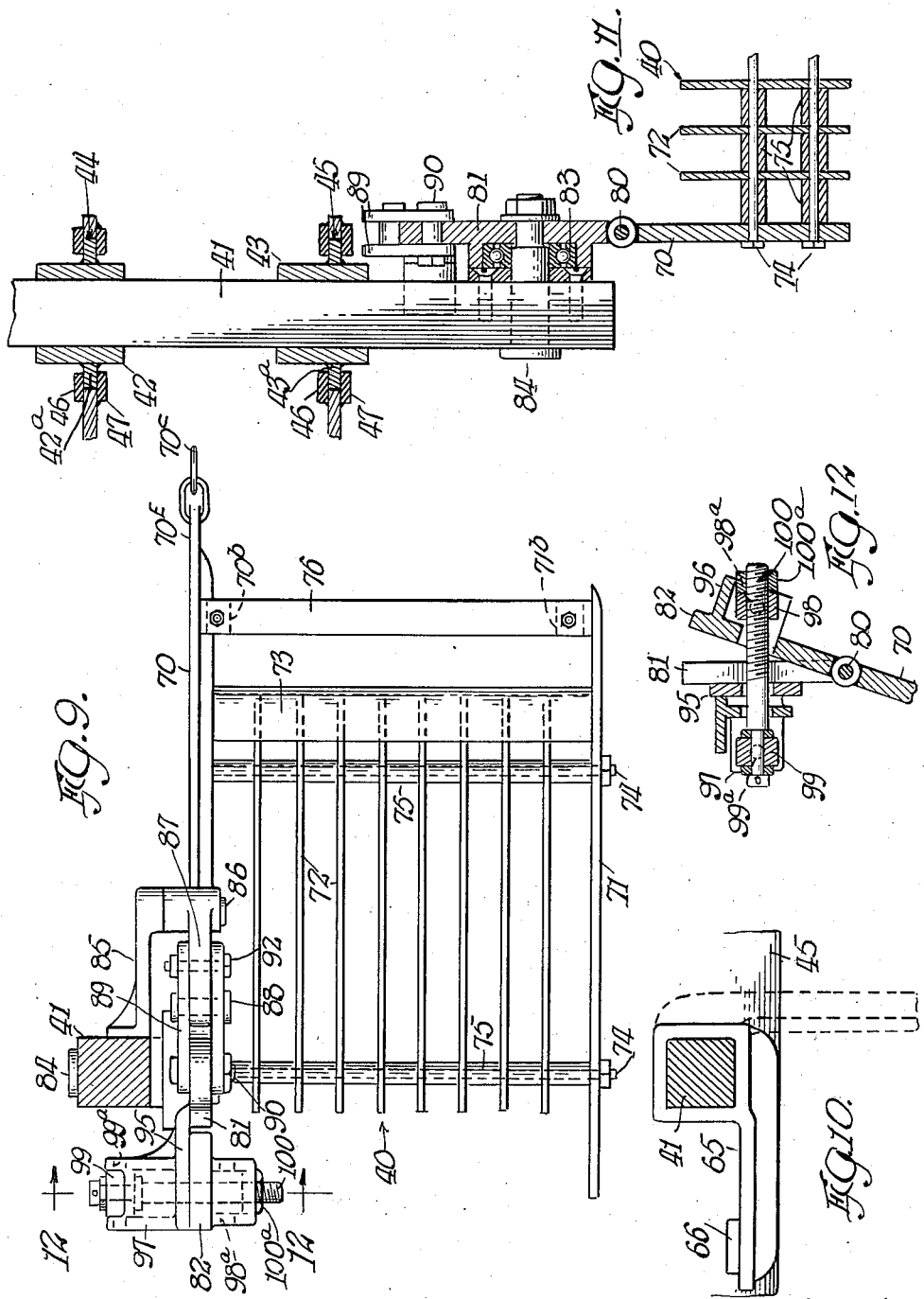
Inventor
William R. Walters

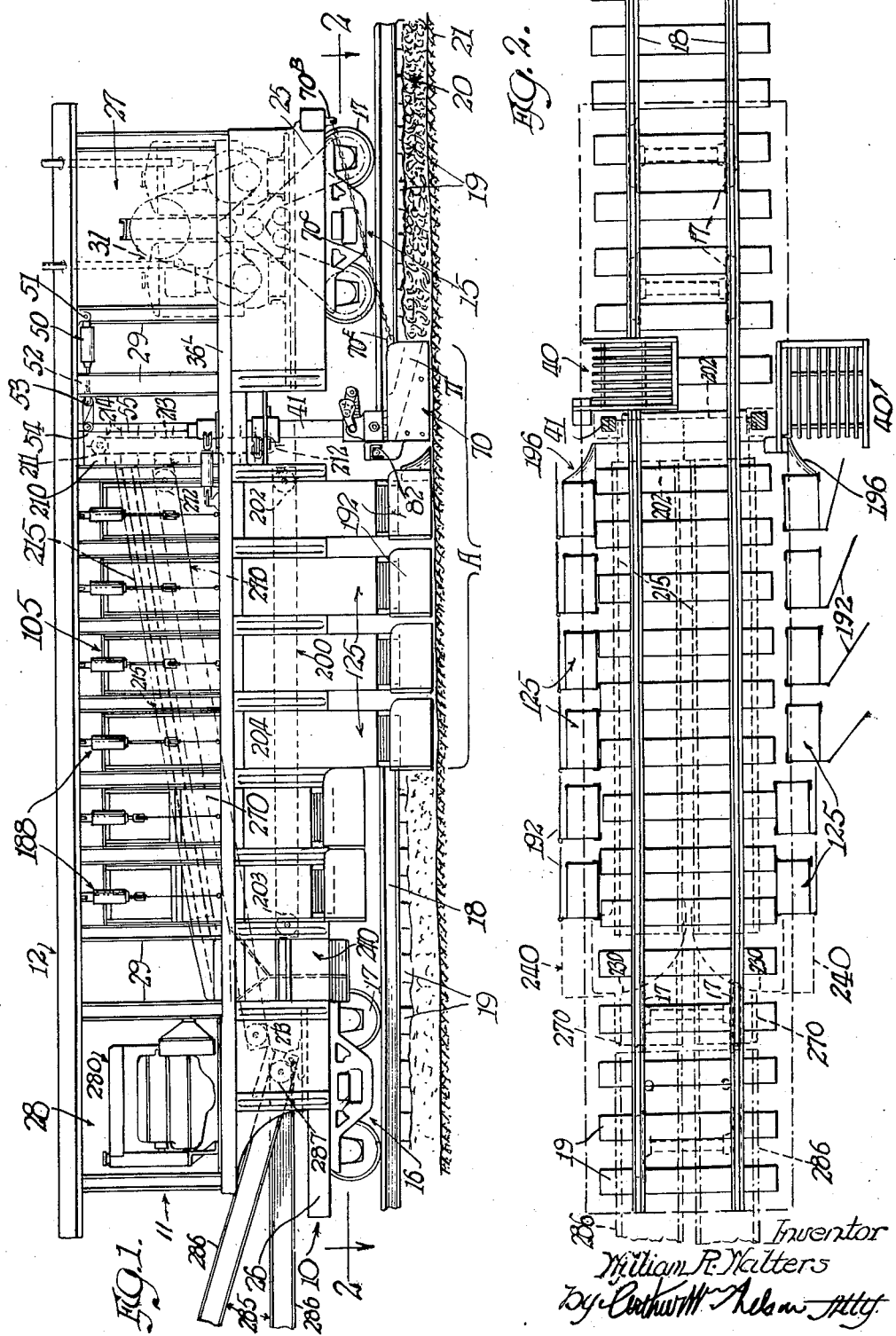

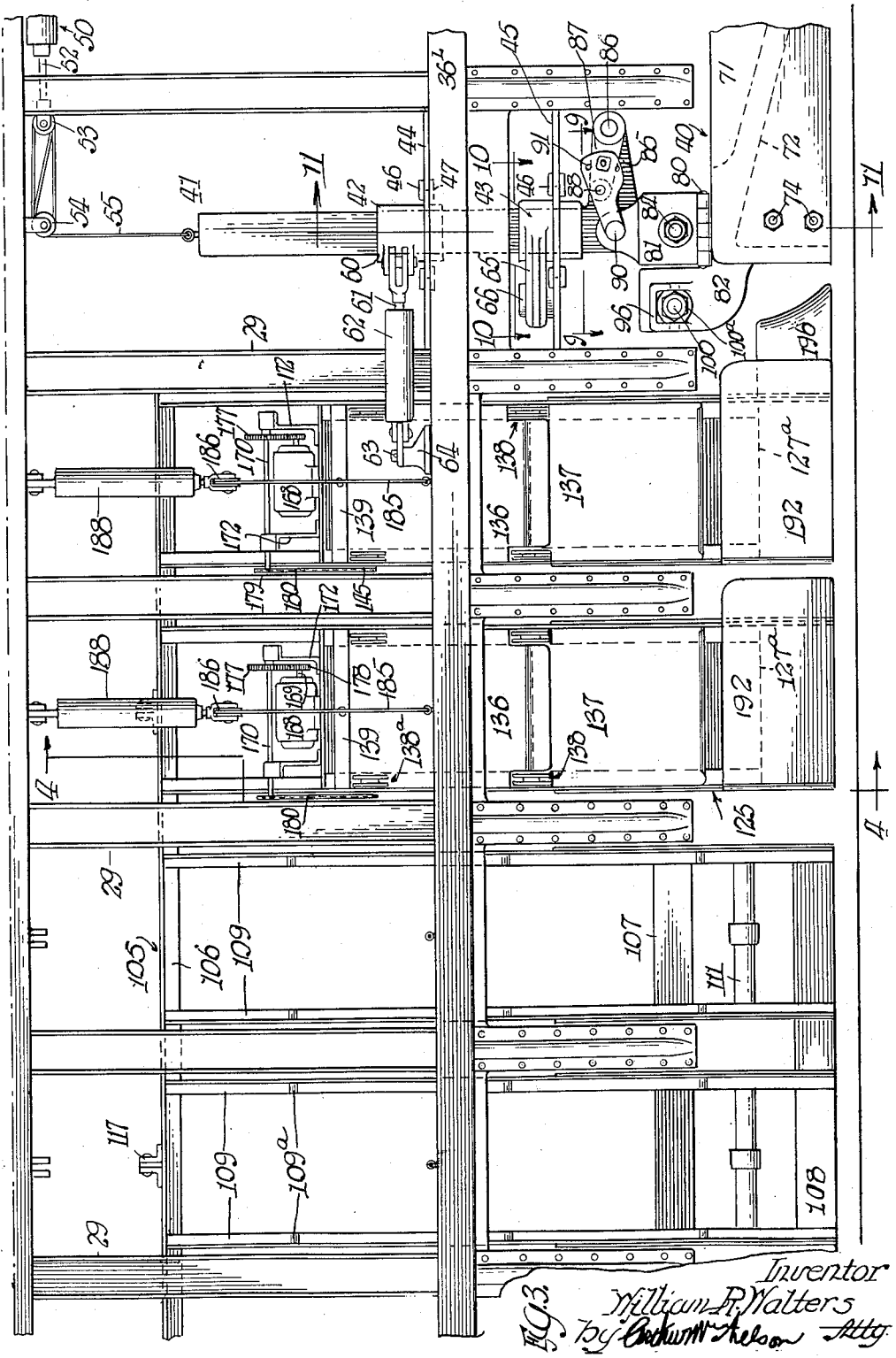

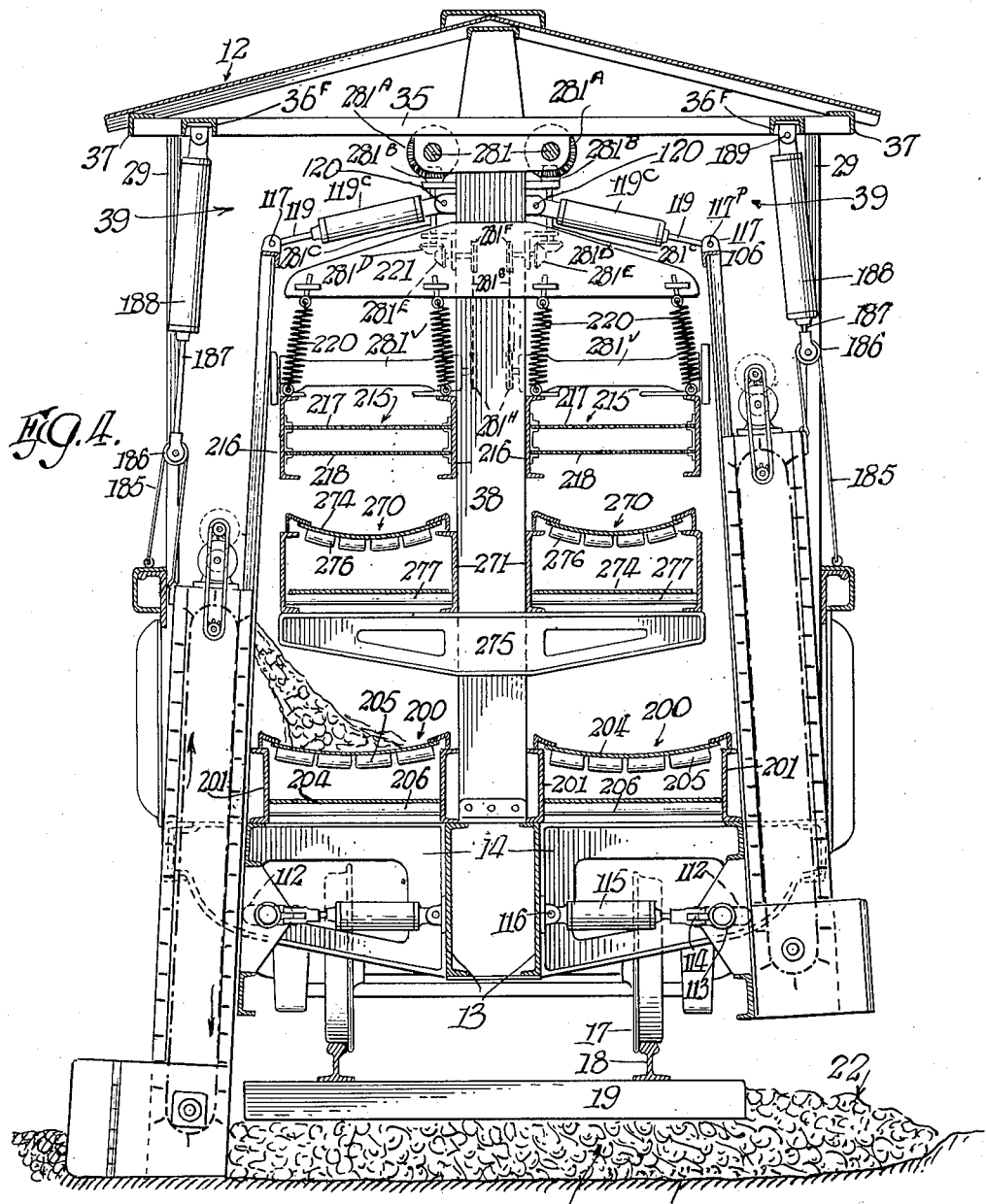

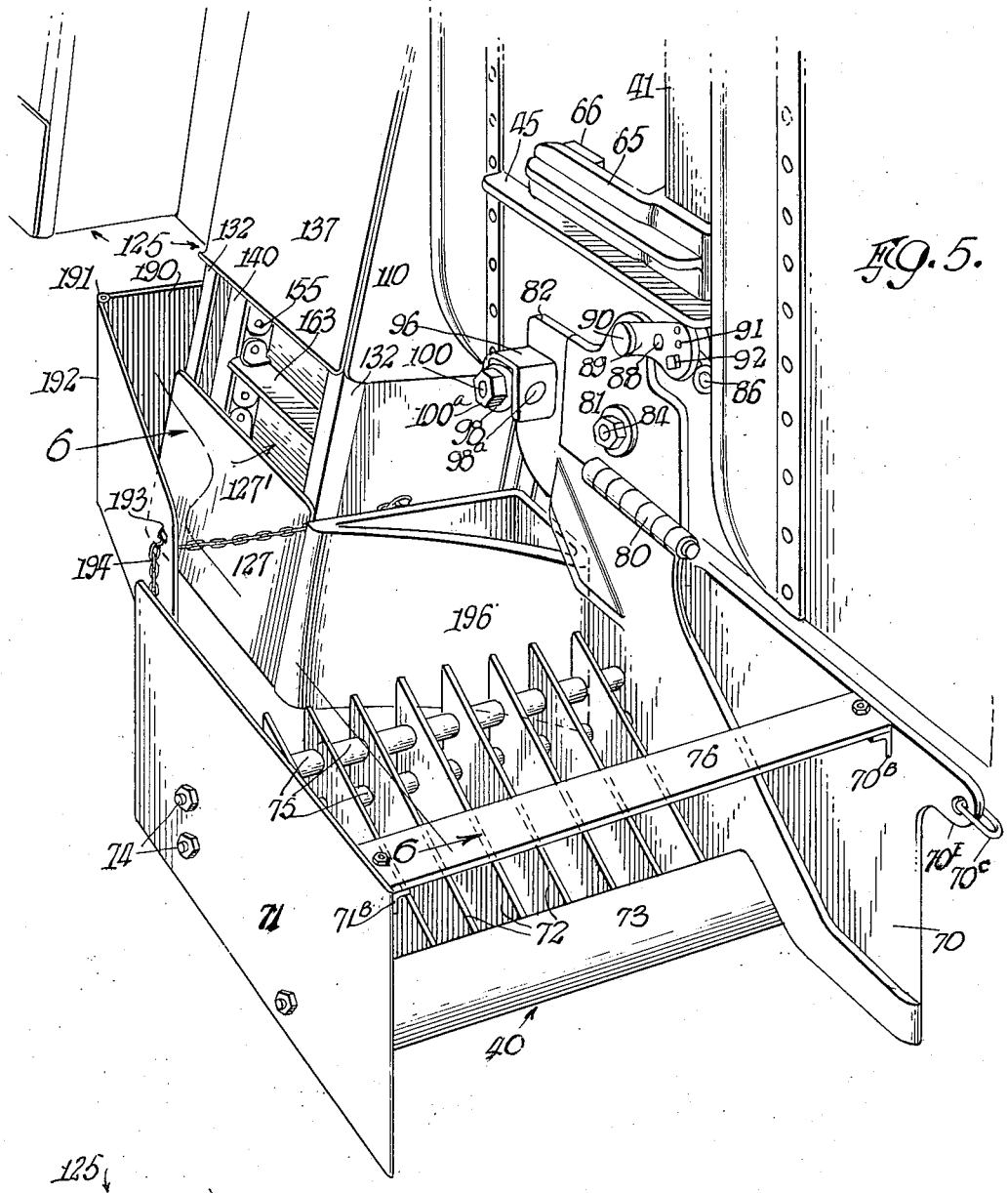

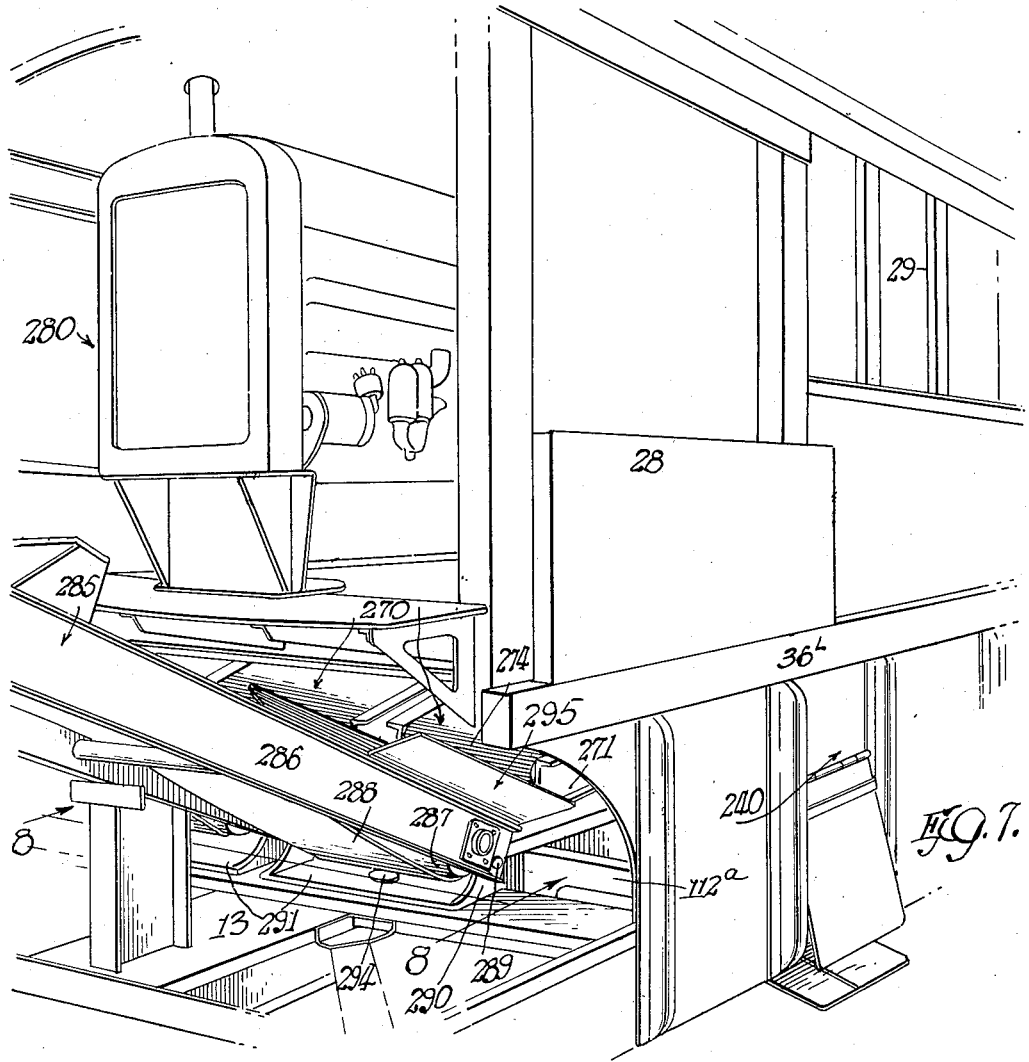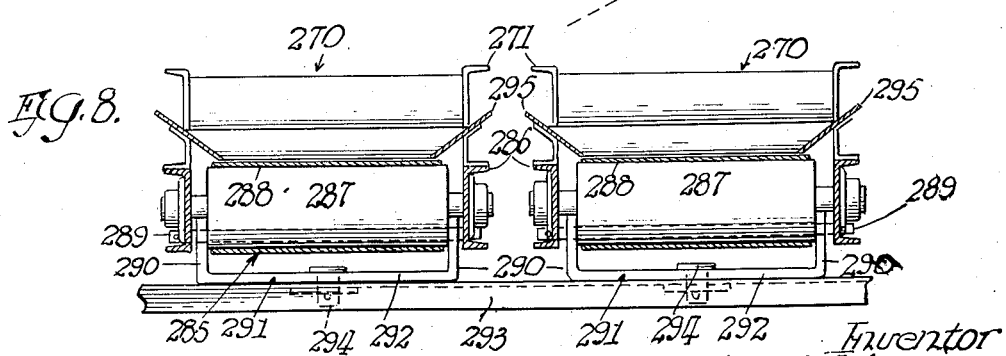

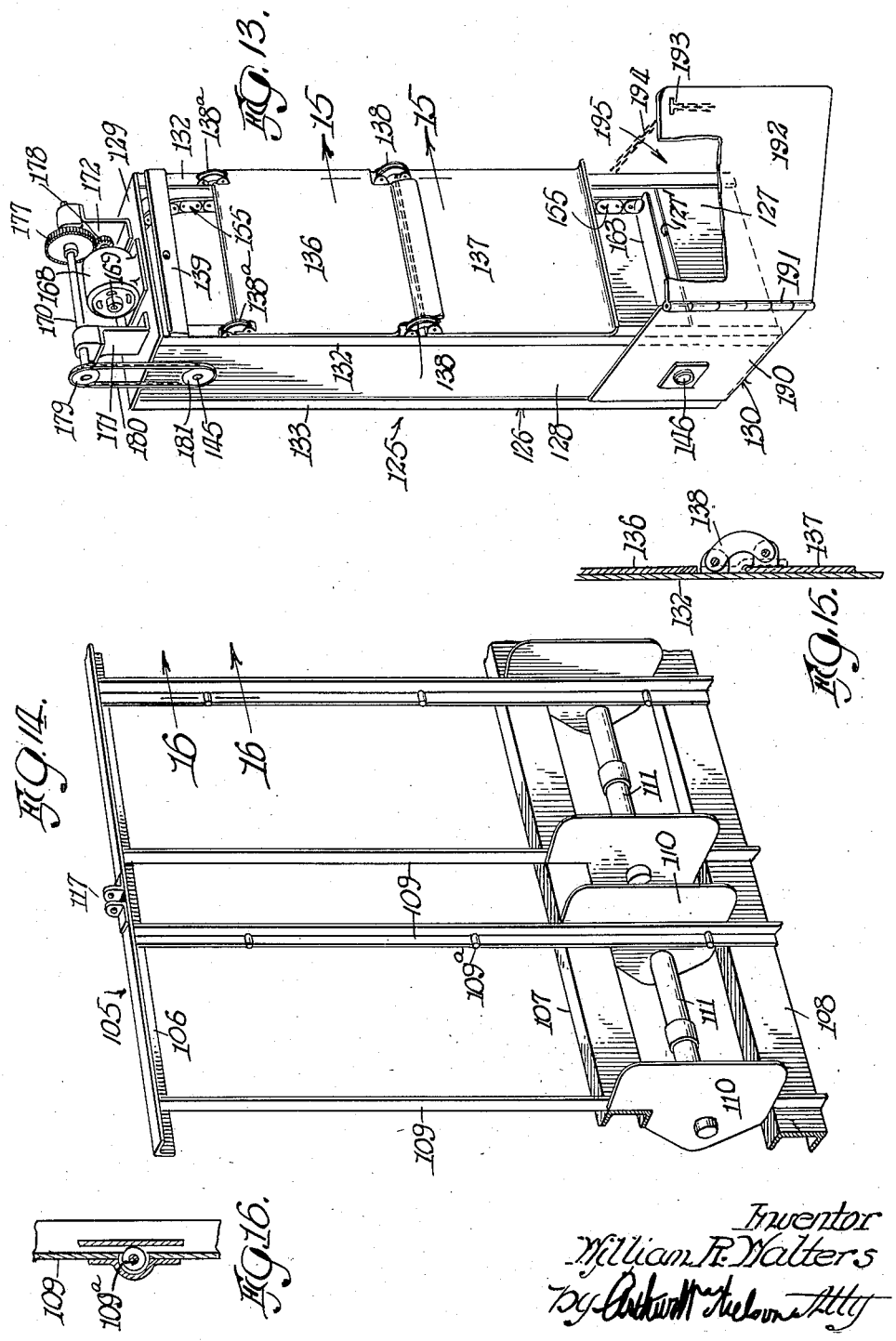

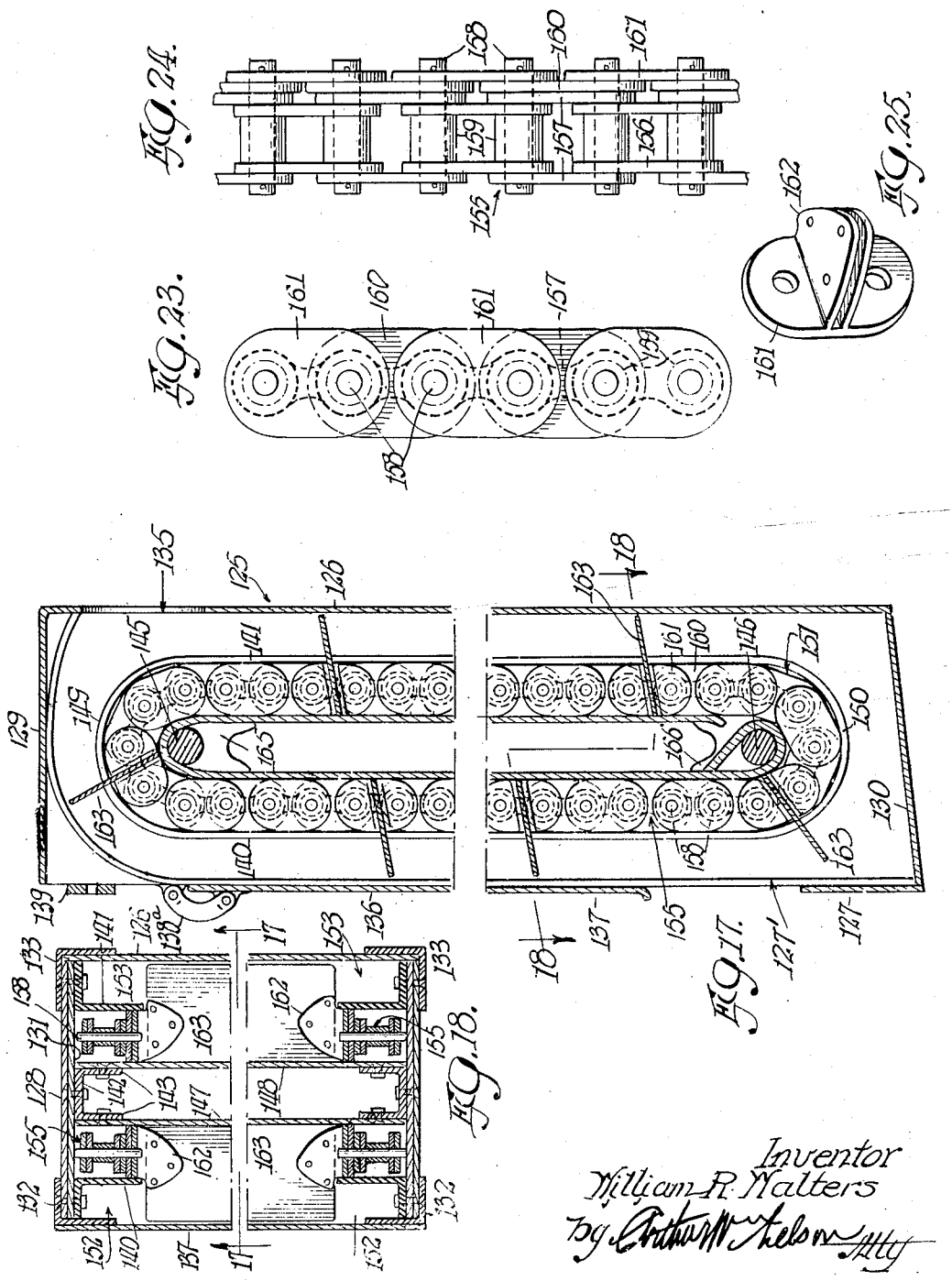

Aug. 25, 1959 W. R. WALTERS 2,900,745
APPARATUS FOR AND IN METHOD OF CONDITIONING RAILWAY BALLAST
Filed May 1, 1953 11 Sheets-Sheet 9
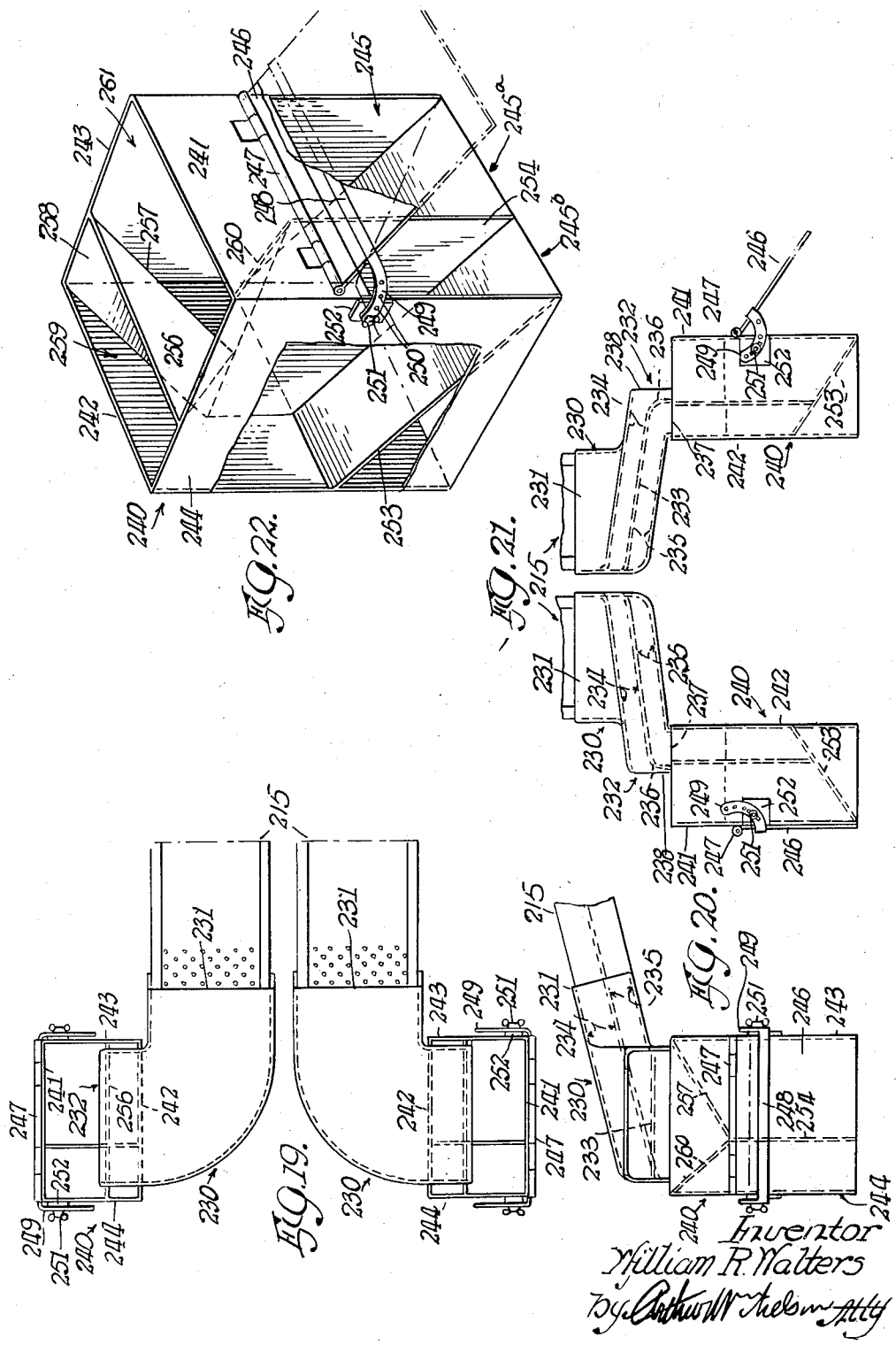

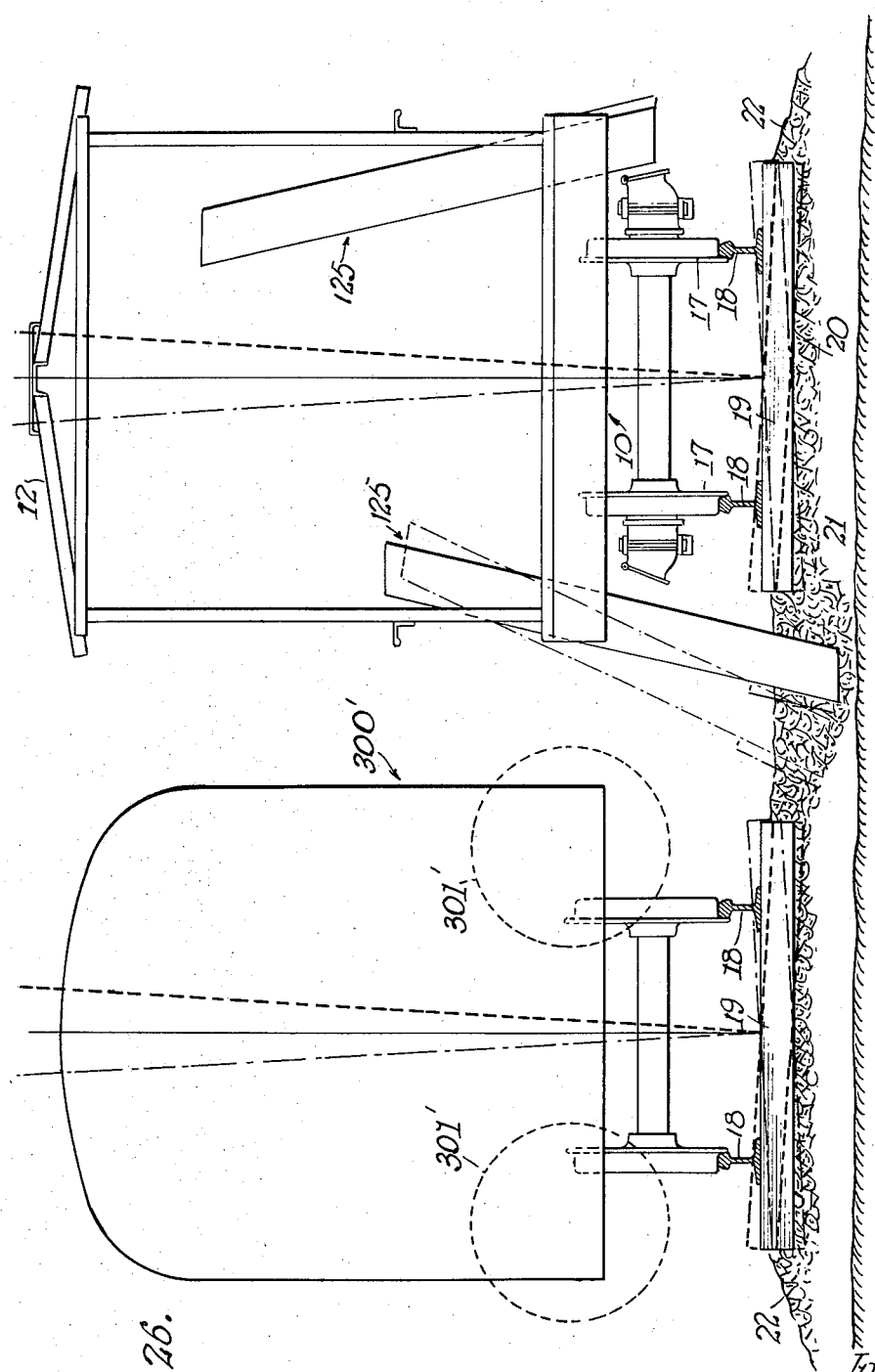

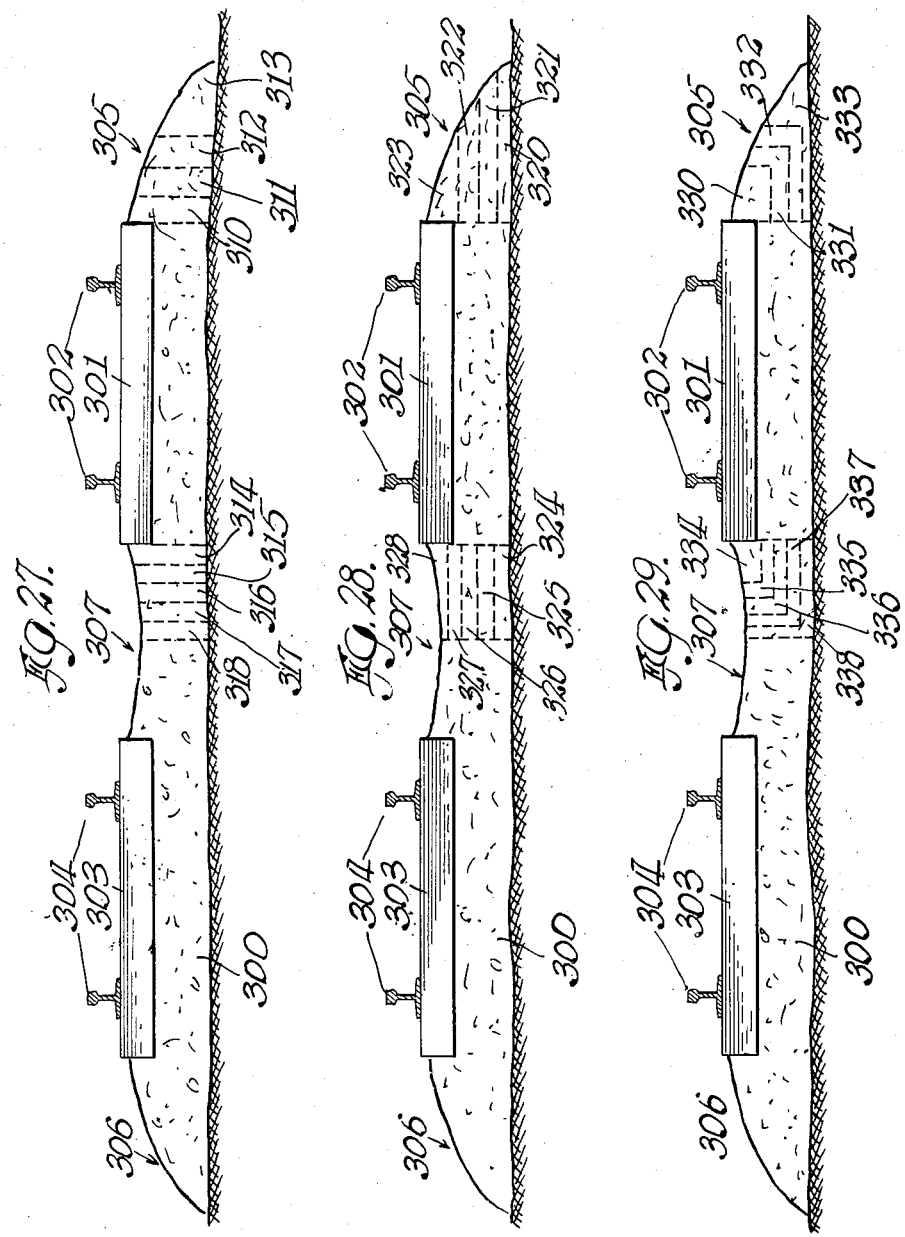

United States Patent Office 2,900,745
Patented Aug. 25, 1959

2,900,745
APPARATUS FOR AND IN METHOD OF CONDITIONING RAILWAY BALLAST

William R. Walters, Cos Cob, Conn.

Application May 1, 1953, Serial No. 352,502

17 Claims. (Cl. 37—104)

This invention relates to improvements in apparatus for and in methods of conditioning railway ballast and it consists of the matters herein described and more particularly pointed out in the appended claims.

It is recognized that even though a railroad track may have been initially well designed and constructed, there are certain operations that must be performed from time to time if the track is to be maintained in good condition. One of the principal elements in railroad bed design is drainage. The section of the road bed and the character and condition of the ballast are both important factors. It has become increasingly clear that clean ballast is a positive requisite for good drainage. Hence, the periodical cleaning or conditioning of the ballast is considered of such paramount importance that many railroads have definite rules governing the times when the ballast shall be cleaned, the depth to which ballast shall be cleaned, and also the manner and condition in which the ballast shall be returned to the shoulders and/or intertrack space as the case may be.

Several kinds of material, such as crushed stone, slag or gravel are used for ballast purposes. In multiple main line railroads the tracks are spaced apart a distance which will permit the passage of trains at full speed and with an ample margin of safety. In such main line railroads crushed rock or slag is preferably employed for ballast rather than gravel which is sometimes employed in single track or secondary line installations.

Crushed rock ballast consists of pieces of rock screened or otherwise graded as to size and which pieces may vary from about 2½" outsize to smaller sizes, chips being generally excluded as undesirable as they fill in the voids between the larger pieces and reduce drainage.

Ballast affords support for the ties and provides a cushion on the subgrade for said ties and the rails carried thereby, as well as keeping the rails in position against undue waving so that full train speeds are possible with an ample margin of safety. To retain the proper functioning of the ballast the voids in the ballast must be kept open for effective drainage, otherwise the track ballast becomes water bound and therefore fails in the performance of at least one of its essential functions.

The invention is more particularly concerned with conditioning the ballast in the tie end shoulders and/or intertrack space of a railroad track as distinguished from the conditioning of ballast in the cribs or inter-tie spaces of the track. The invention contemplates operations including the removal of fouled ballast from said shoulders and/or intertrack space, cleaning the same by removing soil and cinder particles and other undesirable fouling material therefrom so that it may be disposed of as desired, grading the cleaned ballast as to size and replacing the cleaned graded ballast to reform the shoulder end or intertrack space, as the case may be.

One of the objects of the invention is to provide an on the track apparatus of improved construction whereby ballast may be efficiently removed from either one or both sides of the track as the apparatus progresses along the track.

Another object of the invention is to provide an on the track apparatus of improved construction whereby ballast may be efficiently removed from either one or both sides of the track as the apparatus progresses along the track, and which can be readily adjusted to remove ballast to various depths.

Again it is an object of the invention to provide on the track apparatus whereby ballast may be simultaneously removed from both sides of the track in like or different amounts as the apparatus progresses along the track.

A further object of the invention is to provide improved on the track ballast conditioning apparatus capable of efficiently conditioning ballast on a mass production basis as the apparatus progresses at relatively rapid speed along the track, thereby reducing to a minimum the amount of time during which the track on which the apparatus operates remains out of service.

A still further object of the invention is to provide an on the track ballast conditioning apparatus of such construction that when used upon one track of a multiple track railroad it will not foul or form an obstruction to the passage of trains on the adjacent track, thus avoiding the necessity of the so-called "clearing" which means that while the train remains at the point where the work is in progress, the actual ballast pick up means does not necessarily have to be removed from the working position in the ballast shoulder or inter-track space, thereby effecting a great saving of time.

It is another object of the invention to provide an on the track ballast conditioning apparatus of such construction that the ballast removing mechanism may be quickly and easily adjusted as may be required for use under varying conditions which obtain on a railroad, such for example as on straight, level track in order to locate the mechanism in the exact position desired, and also to modify the positions of certain of the mechanism relative to the car, as may be required when operating on curves where the super elevation of the outer rail changes the relationship of the parts relative to the road bed as compared with the parts as adjusted for operation on the straight away parts of the line.

Another object of the invention is to provide an on the track apparatus of an improved character capable of picking up ballast, cleaning the fouling material therefrom and returning the clean ballast to the side of the track while the apparatus is in motion along the track.

A further object of the invention is to provide apparatus of the kind in the nature of a self-propelled railway car, thus eliminating the need of locomotives and which apparatus shall be adapted to remove ballast from the road bed, separate fouling material from the ballast, separate the cleaned ballast into a plurality of sizes, to return the clean ballast to the road bed, meanwhile otherwise disposing of the removed fouling material.

It is also an object of the invention to provide apparatus of this kind which shall be operative in a continuous movement along a track to break up and loosen the hard or caked foul ballast to a predetermined depth and width and then successively removing portions of the loosened fouled ballast for the subsequent cleaning thereof.

Again it is an object of the invention to provide apparatus of this kind in the form of a railway car which shall include ballast break means at each side of its front end of such construction that it may be readily lowered into and raised out of operating position, which when in operating position may be tilted either longitudinally or laterally and which when it is out of said operating position may be turned to an out of the way position under the car when the apparatus is not cleaning ballast, thus facilitating movement of the car along the tracks.

Another object of the invention is to provide an improved method of conditioning a mass of foul ballast lying along and beyond the ends of the ties on either one or both sides of a railroad track in zones of predetermined width and depth consisting in successively removing, whilst advancing along the zone or zones, as the case may be, portions of the mass, each of which in vertical section comprising a cross sectional area less than that of the vertical cross sectional area of the ballast mass in the zone to be removed.

A still further object is to provide an improved method on the order above stated wherein as a preliminary step the ballast is plowed up or broken.

The above mentioned objects of the invention as well as others, together with the advantages thereof, will more fully appear as the specification proceeds.

In the drawings:

Fig. 1 is a view in side elevation of a railway ballast working car embodying the preferred form of the invention, certain of the ballast removing mechanisms being shown in operative position and others in elevated or inoperative position.

Fig. 2 is a horizontal sectional view, of a schematic character, as taken on the line 2—2 of Fig. 1.

Fig. 3 is a fragmentary view, in side elevation, of parts embraced within the bracket "A" of Fig. 1 but on a scale enlarged thereover, certain of the parts being omitted for illustrative purposes.

Fig. 4 is a transverse vertical sectional view through the car as taken on the line 4—4 and substantially on the scale of Fig. 3.

Fig. 5 is a detail view in perspective of the ballast breaking plow-like device and adjacent parts of the car with the plow-like device in its ballast breaking position.

Fig. 6 is a detail longitudinal vertical sectional view through the plow-like device, as taken on the line 6—6, but on a scale smaller than that of Fig. 5.

Fig. 7 is a fragmentary detail view in perspective of parts of the car adjacent the rear operating cab thereof.

Fig. 8 is a detail vertical sectional view through parts of the car as taken on the plane of line 8—8 of Fig. 7, more particularly showing the mounting of certain dirt elevators embodied in the car.

Fig. 9 is a horizontal detail sectional view through parts of the car associated with the ballast breaking plow-like device thereof as taken on the line 9—9 and on a scale enlarged over that of Fig. 3.

Fig. 10 is another horizontal detail sectional view through parts of the car associated with the ballast breaking plow-like device thereof, as taken on the line 10—10 and on a scale enlarged over that of Fig. 3.

Fig. 11 is a vertical detail sectional view through parts of the car associated with the ballast breaking plow-like device as taken on the line 11—11 and on a scale enlarged over that of Fig. 3.

Fig. 12 is a detail transverse vertical sectional view through parts appearing in Fig. 9 as taken on the line 12—12 thereof.

Fig. 13 is a view in perspective view showing more particularly one of a number of side ballast elevators embodied in the car, and which will be more fully described later.

Fig. 14 is a view in perspective of a portion of one of a pair of frames embodied in the car, upon which the elevators of Fig. 13 are so mounted that they may be bodily raised and lowered thereon.

Fig. 15 is a detail vertical sectional view as taken on the line 15—15 but on a scale enlarged over that of Fig. 13, more particularly showing the mounting of the front covers or doors of the elevator of said Fig. 13, whereby said covers or doors may yield or float away or outwardly of the elevator to permit passage of oversized particles of the ballast in said elevator without choking and stopping the same.

Fig. 16 is a detail vertical sectional view as taken on the line 16—16 and on a scale enlarged over that of Fig. 14, more particularly showing the mounting of certain rollers upon the upright rails of the frame of Fig. 14, upon which the elevator of Fig. 13 engages when the latter is being raised or lowered on the associated pair of rails on said frame.

Fig. 17 is a transverse vertical sectional view through one of the side ballast elevators of the car, on an enlarged scale, as taken on the line 17—17 of Fig. 18.

Fig. 18 is a horizontal sectional view through the elevator structure of Fig. 17, as taken on the line 18—18 thereof.

Fig. 19 is a detail plan view of the discharge end of the shaker screens of the car and the associated cleaned coarse and fine ballast distributing chutes for directing the cleaned ballast from the shaker screens into the associated boxes which discharge the cleaned ballast back upon the road bed along the sides of the track.

Fig. 20 is a view in side elevation of the structure appearing in Fig. 19.

Fig. 21 is an end view in elevation of the structure appearing in Figs. 19 and 20 respectively, as viewed from the left hand sides thereof.

Fig. 22 is a perspective view of one of the ballast discharge boxes that appears in Figs. 19, 20 and 21, on an enlarged scale, parts of the box being broken away better to illustrate the interior structure thereof.

Fig. 23 is a face view, on an enlarged scale, of a fragment of sprocket chain of the pin and roller type employed in the elevator shown in Fig. 17, more particularly disclosing the arrangement of certain covering links employed on that face of the chain that is directed toward the longitudinal center of said elevator.

Fig. 24 is a view in side elevation of the fragment of sprocket chain appearing in Fig. 23.

Fig. 25 is a perspective view of one of the covering links of the chain appearing in Fig. 17, and which is provided with means whereby certain flights appearing in Figs. 17 and 18 may be operatively supported from the chains, and Fig. 26 is a diagrammatic view in elevation depicting certain operative parts of the ballast conditioning car on one track of a multi-track railroad and the outline of a locomotive of maximum size on the other track illustrating the fact that the ballast conditioning apparatus does not obstruct the passage of equipment on the adjacent track, when in operating position.

Figs. 27, 28 and 29 are diagrammatic views of double track railroad indicating various methods of sectional removal of zones of ballast lying along the track beyond the tie ends and which may be practiced with the improved apparatus of the disclosed invention.

In general the apparatus is in the nature of a railway work car that includes a chassis with a framing, mounted by means of center and side bearings upon front and rear trucks, having the usual wheels for travel upon the rails of a railroad track. At the front and rear ends of the cars are suitable cabs for use by operators on the car. The front end cab enclosed a power plant and transmission which under the control of the operator in said cab may be caused to drive the car at a running speed in either forward or reverse, or to drive the car at a working speed in forward or reverse and which is slower than running speed. The rear cab also contains a power plant from which certain ballast handling conveyor belts within the car are operated, and certain hydraulic equipment.

At each side of the car, adjacent the rear end of the front end cab is a plow like structure which may be lowered from its inoperative position above and clearing the track rails into a position in the shoulder or intertrack ballast on the same side where, as the car moves forward at working speed, it functions to break, loosen and plow up the fouled ballast depositing it rearwardly of the plow-like structure in a somewhat shoulder-like mass along and parallel with the track. Also at each side of the car, rearwardly of the plow-like structure, is a plurality of means disposed longitudinally of the car which, in the movement of the car, are operative to gather in and pick up, in successive increments or portions, the loosened ballast, depositing the same upon a horizontally disposed forwardly running associated conveyor, inwardly of said means. These conveyors deliver the broken up foul ballast to elevators located rearwardly of the front end cab which elevate the broken up foul ballast, discharging the same at the top into a downwardly and rearwardly inclined sectionalized shaker screen. Suitable means are provided for each section of each screen to shake or vibrate the same, the adjacent ends of the sections in each screen being connected by suitable means which provide for proper flow of material from one section to the other, whilst permitting relative shaking movements thereof. While the fouled ballast is engaged upon the sections of the screen, it receives a vigorous shaking whereby the various rock pieces are forcefully contacted with each other so as to loosen and remove the adhering fouling material therefrom.

These screens carry upper and lower ballast grading plates, the upper plates having a series of openings therein that retain only the larger size rock pieces for rearward movement thereover, while passing smaller size pieces therethrough onto the lower plates. The lower plates have smaller openings therein which screens out rock pieces of smaller size whilst passing those considered undersized for ballast purposes, along with chips, fouling material and the like onto the rearwardly running top lap of a conveyor arranged parallel with and below the shaker conveyor means. Each shaker screen has a lower rear end from which the cleaned larger ballast rock pieces and the cleaned smaller ballast rock pieces are discharged as two separate streams into dual channelled conductors so that each stream is delivered into a clean ballast discharge box, there being one of such boxes at each side of the car.

Each box is so constructed as to provide individual discharge openings, one for the larger cleaned ballast pieces and a second one for the smaller ones, the first mentioned discharge opening being forwardly of the second one. Associated with each box is an adjustable means whereby the discharge position of the ballast pieces can be controlled to the end that the clean ballast will be in position for reshaping as desired. It is pointed out that with the structure described, the larger size ballast pieces are first discharged upon that part of the road bed from which the foul ballast had earlier been removed, the smaller sizes of rock pieces being then discharged upon the discharged ballast to form a topping layer.

The removed ballast fouling material discharges from the rear lower end of the receiving conveyor onto the lower front end of an associated fouling material discharge conveyor which is so mounted under the rear end cab as to have its rear discharge end elevated at the desired angle so that the discharge conveyors may be shifted or swung from a position parallel with and extending rearwardly of the car to a position extending laterally of the sides of the rear end of the car. Thus, it is possible to discharge the removed foul material into a dirt car behind and coupled to the work car when so desired or to discharge the removed foul material or dirt laterally of the car as the ballast conditioning operation proceeds.

At each side of the car framing is a generally upright elevator guiding frame which is so mounted on the car framing that the elevator guiding frame can be bodily moved inwardly or outwardly of the side of the car. The actuating means is also such that the frame can be swung inwardly and outwardly from a horizontal pivot located adjacent the bottom of the frame and also swing inwardly and outwardly from a horizontal pivot located adjacent the top of the frame.

Each frame includes a plurality of pairs of longitudinally spaced upright rails, each pair having slidably mounted therein one of the ballast gathering and pick up means before mentioned. Each of these last mentioned means has associated therewith means for raising and lowering the same from its down or operative position in the ballast at various depths to its up or inoperative position wherein the bottom end of each means is disposed above the top of the rails. The arrangement further is such that in no position do the ballast pick up means obstruct or interfere with movement of trains on the adjacent track of a multi-track railroad.

The arrangement is also such that any one or all of the ballast pickup means on one or both sides of the car may be selectively placed into operation since each means carries its own driving unit.

Referring now in detail to that embodiment of the invention illustrated in the drawings, as best appears in Figs. 1 and 4, the improved ballast conditioning apparatus is in the form of a railway "work" car, which includes an underframing 10 on which is mounted a generally open sided body 11 having a roof 12.

The underframing includes a center sill 13 that extends the full length of the car, said sill carrying laterally extending bolsters 14, one of which appears in Fig. 4. The underframing is mounted by means of suitable conventional center and side bearings (not shown) upon front and rear trucks 15 and 16 respectively, each of which includes side frames in which are journalled the axles for pairs of front and rear wheels 17. These wheels are the usual flanged type for running on the rails 18 of a railroad track which rest upon and are secured to the cross ties 19. As best shown in Figs. 1 and 4 these ties are engaged upon suitable ballast 20, in turn resting upon the subgrade 21. As best shown in Fig. 4 the ballast which, for example, may be crushed rock is disposed between the ties as "crib" or inter-tie ballast and extends outwardly beyond the ends of the ties to there form the shoulder 22 or part of the ballast in the intertrack space of a multi-track railroad as the case may be. The present invention is more particularly concerned with means for operating upon the shoulder and/or intertrack ballast to condition the same, as distinguished from that in the cribs or inter-tie spaces.

The underframing also includes front and rear side sill portions 25—26 which are coextensive in length with front and rear end cabs 27—28, for members of the crew who operate the car during ballast conditioning operations.

Between these side sill portions at each side of the car are longitudinally spaced upright structural posts 29 which at the top support in part the roof 12. The bottom ends of said posts are supported from cross bracing parts of the underframing.

The front operator's cab houses a power generating and transmission unit 31 which is only shown in dotted lines in Fig. 1. The transmission drives the axles for the front and rear wheels of the front truck by means of a sprocket and chain construction in either a "running" forward or reverse speed or direction, or in a "working" forward or reverse speed. By a running speed is meant the movement of a car between places of operation and by "working" forward and reverse speed is meant such speeds of the car as obtain in a ballast conditioning operation. This specific construction of this unit forms no part of the present invention being illustrated, described and claimed in my copending application for patent, Ser. No. 352,501 filed May 1, 1953, entitled Traction Means for Railway Cars, now Patent No. 2,851,962.

The posts 29 are operatively secured at their top ends to a roof frame which includes longitudinally spaced transverse members 35 and pairs of longitudinally extending inner and outer members 36F and 37 respectively, there being a pair of such members at each side of the car. The central portions of the transverse members 35 are supported from the center sill by upright columns 38 which divide the interior of the car body into two similar sections 39—39. The parts just above described best appear in Fig. 4.

The foul ballast breaking plow-like device

At each side of the car, just to the rear of the front end cab 27, is a foul ballast breaking plow-like device indicated as a whole at 40 and best appearing in perspective in Fig. 5. Since the construction thereof on each side of the car is the same, a description of one will suffice for both. The plow-like device 40 is mounted on an upright post 41 which has sliding guided engagement in upper and lower guide collars 42 and 43 respectively. The collars 42, 43 include radial circular flanges 42ª—43ª respectively which fit and turn in openings provided therefor in upper and lower horizontal floor plates 44—45 forming parts of the car body. These floor plates each have a pair of upper and lower retainers 46—47 so welded thereto as to over and under lap parts of the flanges 42ª and 43ª as to confine the collars 42—43 against vertical movement but to permit the turning movement of said collars relative to said floor plates. With the construction just above described, and which appears best in Fig. 11, it is obvious that the post 41 can slide through said guide collars 42—43 and can turn with said collars as they turn relative to the floor plates 44—45.

To impart a raising and lowering movement to the post there is provided an associated horizontally disposed power cylinder 50 (see Fig. 1) which is pivoted at one end at a point 51 on the longitudinal frame members 37 on the same side of the car. A piston having a piston rod 52 is associated with the other end of said cylinder and it carries a pulley 53. A second pulley 54 is fixed to the member 37 in vertical alinement with the axis of the post 41 on the same side of the car, a cable 55 being fixed at one end to the top end of the post 41. This cable passes about the pulleys 53—54 being fixed at its other end to the piston rod 52. When the piston rod 52 is retracted into its cylinder the cable imparts a raising movement to the post and when the piston rod 52 is extended the post will descend because of its own weight and that of the plow-like device which is attached to its lower end.

To impart a turning movement to the collars 42—43 and the associated post, the following structure is provided. The upper collar 42 is provided with a laterally extending arm 60 (see Fig. 3) to which one end of a piston rod 61 is pivotally connected. The piston of said rod slides in a horizontally disposed power cylinder 62 which is pivotally mounted at its rear end on a vertical stud 63 carried by a bracket 64 on the associated side rail 36ᴸ of the car body as best shown in Fig. 3. The lower collar 43 has an arm 65 which is adapted to engage against an upright stop 66. By actuating the cylinder 62 the sleeves and post may be turned back and forth through an angle of 90°.

The plow-like device 40 includes upright laterally spaced longitudinal inner and outer side plate 70—71 respectively and a plurality of laterally spaced upright plow plates 72. The plow plates are shorter than the side plates, the front and rear ends thereof being spaced from the similar ends of the side plates. The plow plates are of three sided shape tapering from a high rear end to the front end to there form a point. The front ends of said plates 72 are incased in a cutter bar 73, the bottom edges of their plates being disposed in the plane of the like edges of the side plates. The plow plates 72 are operatively secured to both side plates 70—71 by front and rear through bolts 74. On said through bolts between said plates are sleeves 75 which hold the various plates in desired spaced relation as a unit assembly. The front ends of the side plates are connected together at the top by a bridge bar or saddle 76. The parts just described best appear in Fig. 5. The bar 76 may be detachably secured to brackets 70ᴮ and 71ᴮ on the side plates so that the effective width of the plow-like device 40 may be changed. To this end the nuts on the through bolts would be removed, plate 71 withdrawn, and plates 72 and the spacing sleeves either added or removed. It will be understood that saddle bars 76 and cutter bar 73 of proper width would then be substituted.

The upper rear end of the inner side plate 70 has a pivotal connection 80 with a plate member 81, said side plate including an upward extension 82 at its rear end, the purpose of which will soon appear. The plate member 81 is pivotally, by means of an antifriction bearing 83 (see Fig. 11) on a horizontal shaft 84, fixed in the bottom end of the post 41. The plate member 81 can thus rock on its bearing 83 and carry the plow-like device 40 therewith so that its front end can be tilted upwardly or downwardly. As the plow-like device has the pivotal connection 80 with this plate member it can also be tilted laterally with respect to said plate member.

To impart rocking movement to the plate member, the bottom end of the post 41 is provided with a laterally extending arm 85 that carries an outwardly extending stub shaft 86 journalled on the outer end of said shaft is a rearwardly extending arm 87. The rear end of this arm is pivotally connected at 88 (see Fig. 3) to the mid portion of a third arm 89, the rear end of which is pivoted at 90 to a part of the plate member 81. The front end of the third arm is widened out, being there provided with a number of openings 91 disposed on an arc having the pivot 90 as a center. A pin bolt 92 carried by the second arm 87 may therefore be passed through the desired opening 91. By this arrangement the angle between the second and third arms may be varied to turn the plate member 81 relative to its post 41 and thus afford an adjustment of the up and down tilt of the plow-like device 40 longitudinally of the car when the plow-like device is in its operating position.

To impart a lateral tilt of the device 40 about its pivotal connection with the plate member 81 there is provided, on the rear side and end of the plate member 81, and extension 95 disposed behind the extension 82 so as to afford a back stop therefor when said inner plate 70 is disposed in the plane of the plate member 81, as best appears in Fig. 9. The opposite faces of the extensions 82 and 95 respectively carry hoods 96 and 97 respectively, there being rockably mounted in said hoods, blocks 98 and 99 respectively. The rocking movement of said blocks 98—99 is afforded by pairs of lateral studs 98ª—99ª respectively which have bearing engagement in the sides of the respective hoods. A shaft 100 extends through both blocks and through suitable openings provided therefor in the extensions 82—95, as best appears in Fig. 12. One end of this shaft is reduced in diameter and has a swivelled engagement in the block 99. The other end of the shaft, which is threaded, slides through the block 98 and is provided with a threaded nut 100ª which abuts the outer face of the block 98. Thus, by turning the nut 100ª, the blocks 98—99 may be moved toward or away from each other to fix the angle of lateral tilt between the plow-like device 40 and member 81 as the plow swings about its hinged connection 80 with said member.

In order to resist the forces exerted against the plow-like device 40, as it moves forward in the ballast, a chain 70ᶜ is provided. It is connected at one end to the extension 70ᴱ of the inner plate and at the other end to a bracket 70ᴮ secured to the framing of the car (see Fig. 1). When the plow-like device 40 is to be swung into inoperative position under the car one end of the chain 70ᶜ is disconnected.

Guide frames for ballast pick up elevators

Located in and extending longitudinally of outer portions of each section 39 of the car body is a relatively open frame, a fragmentary part of which appears in Fig. 14, being there indicated as a whole by the numeral 105. Since the construction on each side of the car is the same, a description of one structure will suffice for both. Said frame includes a top longitudinal angle 106 and a pair of vertically spaced upper and lower channels 107 and 108 respectively. The bars and channels mentioned are operatively connected by pairs of longitudinally spaced upright angle bar rails 109, the spacing between the rails of each pair which cooperate to form guides for the ballast elevators (Fig. 13) being greater than the spacing between contiguous single rails of adjacent pairs of rails, as best appears in said Fig. 14.

The rails of each pair are provided between the channels 107—108 with outwardly extending plates 110, the plates of each pair of rails being connected by a horizontal shaft 111 that extends parallel with and is disposed midway between said channels.

In the mounting of said frames in the car structure these shafts slide in elongated openings 112 (shown in dotted lines in Fig. 4) in the body bolsters and transverse members of the underframe, one of these transverse members 112a appearing in Fig. 7. Thus, the frame 105 is supported towards its bottom from parts of the underframe for an in and out movement as well as a limited pivotal movement about the axis of the shafts 111.

To impart such in and out movement to the frame 105, the shafts 111 have fixed thereto collars 113 with inwardly extending arms 114 (see Fig. 4). Each arm is pivotally connected (about a vertical axis) to the outer end of a piston rod, the inner end of which carries a piston (not shown) that slides in a power cylinder 115, pivotally connected horizontally at its inner end as at 116 to the adjacent side of the center sill 13. By actuating the piston and rod of this cylinder it is obvious that the bottom end of the frame 105 may be moved inwardly and outwardly.

At longitudinally spaced points along the top angle bar 106 of the frame in line with each post 38 (see Figs. 1 and 4) is a plurality of pairs of upstanding ears 117 and to each pair of ears is pivotally connected at 117p the outer end of a piston rod 119, the inner end of which carries a piston (not shown) that slides in the outer end of an associated power cylinder 119c. Each cylinder is pivotally mounted about a horizontal axis 120 on an associated post 38. By causing the pistons of said cylinders to be extended or retracted, the top end of the associated frame is caused to swing inwardly and outwardly about its horizontal shaft 111 as an axis. By actuating the piston rods of the lower cylinders 115 and upper cylinders 119c simultaneously in the same direction the frame 105 will move as a whole inwardly or outwardly in accordance with the direction of movement of the pistons. If the pistons in the upper cylinders 119c only are actuated the frame as a whole swings about the shafts 111 as an axis while if the pistons of cylinders 115 only are actuated the frame 105 swings about the horizontal pivots 117p.

Each rail 109 of each pair of rails of the frame 105 is constituted by an angle bar with one flange of each rail extending outwardly of the frame and with the other flange of each rail facing toward one another. These last mentioned flanges have journalled therein longitudinally spaced sets of rollers 109a, a peripheral part of each of which extends outwardly of the other face of its associated flange that carries the same, as best appears in Fig. 16 and the purpose thereof will soon appear.

*The foul ballast gathering and pick up elevators*

Associated with each pair of rails 109 is a foul ballast gathering and pick up elevator, one of which is shown in perspective in Fig. 13 and is there and elsewhere indicated as a whole by the numeral 125. Since each elevator is alike a description of one will suffice for all. The elevator is in the form of a vertically elongated built up box-like casing of such width as to fit slidably between the outwardly extending flange of a pair of angle bar rails 109 of the frame 105. The casing has a back 126, a front 127, sides 128, a top 129 and a bottom 130, the latter being inclined upwardly and inwardly as best shown in Fig. 17, the purpose of which will be explained later. Each side has an inner liner plate 131 which appears best in Fig. 18. At the corners of the casing are front and rear reinforcing angle bars 132 and 133 certain flanges of the rear angle bars riding upon the rollers 109a in the movement of the casing up and down the rails 109 of the associated pair of rails, the other flanges of said rails acting as side guides for the casing.

Near the top end of the backwall 126 is a ballast discharge opening 135. The fixed front portion 127 extends only a short distance upwardly from the bottom so that the remainder is open. This open part of the front is normally closed by upper and lower covers 136 and 137 respectively, the side margins of which normally engage upon the front flanges of the angle bars 132 of the casing so as to form movable closures therefor above the top edge of the fixed front portion 127 and the top of the casing. The bottom edge of the lower cover 137 is curled outwardly and it coacts with the top edge of the fixed front portion 127 in providing the broken foul ballast inlet 127' into the interior of the casing. The top end of this cover plate is connected by pivoted links 138 to the front faces of the angle bars 132. The bottom end of the upper cover overlaps the top end of the lower cover plate portions of said lower end of the top cover plate, at the sides thereof, being cut away so as to accommodate the pivoted links 138 of the lower plate 137. The top end of the top cover plate is connected by similar pivot links 138a. Such an arrangement of covers enables them to "float" or move outwardly away from the casing and back again. Thus, should extra large pieces of rock or other material be present in the ballast being handled by the elevator, such oversize objects will engage the covers, whereupon they will yield or open up outwardly to accommodate the same and then drop back to the closed position after such rock has passed the door, thus avoiding damage to the elevator mechanism. A cross bar 139 is fixed at its ends to the front faces of the front angles 132 above the upper door and to which is attached certain cable means employed in raising and lowering the casing in its associated pair of rails 109, as will be later described.

The side wall liner plates 131 have attached to their inner faces front and rear inwardly extending rails 140 and 141 and channel 142 having inwardly extending flanges 143 spacing the plates 147 and 148 apart (see Fig. 18).

In the sides and the liners of the casing are journalled upper and lower horizontal shafts 145—146 that are parallel with the front and the back of the casing. Front and rear plates 147—148 connect the flanges 143 of the channels at both sides of the casing. The ends of the flanges are joined at the top and the bottom by rounded sections 149 and 150. The plates 147—148 are joined at the top and cover the top shaft 145. The bottom end of the plate 147 is curled above and encloses the lower shaft 146. With this structure, which best appears in Figs. 17 and 18, there is provided in the casing a continuous rail or track way 151 with straight front and rear portions connected by rounded top portions as well as front and rear continuous flight chambers 152 and 153 respectively.

A continuous chain 155 of the link pin and roller type is located in each track way, the structure of this chain best appearing in Figs. 23–24. As therein shown, each chain includes pairs of inner and outer links 156, 157, the ends of which are arranged in overlapping position, being joined together by pivot pins 158. On each pin, between the inner links 156, is mounted a roller 159 that can turn on the pin. Associated with that side of each chain that faces inwardly of the casing are inner and outer cover links 160, 161 respectively, which overlap at the ends having portions of the pins 158 extending therethrough to provide a pivotal connection of said links with the chain which is coincident with the pivotal points of the inner and outer links 156 and 157 of the chain, as best appears in Figs. 23–24. The cover links are wider than the inner and outer links 156—157 of the chain, being as wide as the track way 151 so that the edges thereof ride on parts of the flanges 140—141 and parts of the plates 147—148. It is to be noted from Fig. 23 that the outer cover links almost engage each other at the ends, at the middle of the inner cover links. Thus, these cover links prevent to a great extent the flow of abrasive particles of the ballast being handled in the casing from flooding about the inner and outer chain links and the rollers on the pins thereof.

Certain of the outer cover links 161 are provided, on their exposed face, with a pair of flight end receiving flanges 162 as appears in Fig. 25, these flanges having the ends of associated flights 163 riveted thereto. It is to be noted from Figs. 17 and 25 that these flanges are disposed at an angle less than a right angle to the length of said outer links so that the flights which travel in the passageways 152—153 are tilted with respect to the chains as best appear in said figures. If desired the angle of the tilt may be changed to one opposite that appearing in Fig. 17 by reversing the links top from bottom.

Fixed to each shaft 145—146 within the planes of the trackways are sprockets 165 and 166 respectively (see Fig. 17) and with which the rollers 159 of the chains engage.

Preferably the chains and flights in each casing are driven independently of like channel flights in the other casings so that each elevator is a unit independent of the others. Thus each elevator carries its own drive arrangement which may be conveniently mounted on the top 129 of the respective casing, as best shown in Fig. 13. The drive arrangement shown includes a motor 168 mounted on said top 129 with its armature shaft 169 arranged parallel with the shaft 145. Above this motor is a shaft 170 that is journalled at its ends in bearings mounted on columns 171—172 rising from the top 129 of the casing. The shaft 170 is provided with a gear 177, just inwardly of the column 172, this gear meshing with a pinion 178 on one end of the motor armature shaft 169. On that end of the shaft 170 outwardly of the column 171 is fixed a sprocket 179, which, through a chain 180, drives a companion sprocket 181 on the associated end of the shaft 145.

When the motor 168 is energized it will through the pinion and gear 178—177, shaft 170, sprockets 179—181 and chain 180 drive the shaft 145. This will cause the chains 155 and flights 163 in the front passageway 152 of the casing to travel upwardly and those in the rear passageway 153 to travel downwardly. As the flights sweep around the bottom of the trackways they will pick up the ballast entering the casing through the ballast inlet of the casing as provided by the top edge of the front 127 and the bottom edge of the lower cover plate 137. Such ballast as picked up by the flights 163 is carried upwardly by said flights in their upward travel. As said flights travel about the rounded top ends of the trackways, each flight will throw the ballast out through the ballast discharge opening 135 in the top end of the back 126 of the casing so that it will be delivered to conveying mechanism later described.

The casing as a whole is raised and lowered on its associated pair of frame rails by the following structure. One end of a cable 185 (see Fig. 4) is attached to the bar 139 of the casing, the other end being attached to the rail 36ᴸ on the same side of the car. The mid portion of this cable is trained about a pulley 186 on the lower end of a piston rod 187, connected to a piston (not shown) that slides in a power cylinder 188. The upper end of the cylinder 188 is pivoted at 189 to the frame member 36ᶠ, as best appears in said Fig. 4. When the piston rod is retracted into its cylinder 188 as in the right hand side of Fig. 4, it will function to raise or lift the elevator as a unit relative to its pair of rails 109 of the frame 105. When the piston rod is extended from its cylinder as in the left hand side of Fig. 4, the elevator as a unit moves downwardly of its pair of rails, under its own weight, into the operative position in the ballast shoulder at the left hand side of the track. By controlling the actuation of the power cylinder 188 the operative position of the bottom end of its associated elevator unit in the ballast 22 may be regulated as to depth.

On the bottom end of the rearward side 142 of the elevator casing is an outwardly projecting plate 190, the outer vertical end of said plate being hinged as at 191 to the rear end of a vertical ballast gathering wing 192 that is wider than the associated casing as best appears in Fig. 13. The upper front end of the gathering wing is formed with a T-shaped opening 193 through which may be passed a part of a retaining chain 194, the other end of which is attached to the other side of the casing. In the forward movement of the car in a ballast cleaning operation, the gathering wing will cut through the loosened ballast and cause all such ballast inwardly of the front edge of the gathering wing to flow into the space 195 between the wing and the front 127 of the casing and will pile up in this space against the outer part of the wing supporting plate 190. As this plate and its wing have a greater height than the front portion 127 of the casing, the top portion of the accumulated ballast will spill into the casing through the ballast inlet opening 127' of the casing and into the interior thereof. By fixing the chains 194 of the several elevators at successively increasing lengths, the effective gathering position of the various wings may be controlled. Thus, as shown in Fig. 2, the wings of the first four elevators on the near side are arranged so that the effective gathering front edges are positioned at different distances outwardly of the front 127 of the associated elevator. Hence, as shown, the wings will gather in the ballast in successive vertical strips or lanes, outwardly of these elevators.

Thus each gathering wing gathers in only that amount of ballast, which the associated elevator can conveniently handle. In this way it is assured that the ballast will not overload or choke the first elevator. Therefore, it is possible to direct the proportionate share of ballast into each elevator for handling so that the operating load is the same for each elevator and whereby a better and more efficient operation is possible for each elevator. It is, of course, obvious that all or any part of the various elevators on one or both sides of the car may be operated as conditions require.

In the lower portion of Fig. 2 the breaker plow 40 is shown in its operative ballast breaking position so that when the car is moving forwardly the ballast in the adjacent part of the road bed 22 is raised and broken up by the plow. Some of the ballast material flows upwardly of the members 72 to spill over the rear end thereof, then dropping back into the path made by the plow while other parts of the ballast that is of such size as to pass through the spaces between plates 72 falls therethrough. As the inner side plate 70 of the plow is disposed in substantially the plane of the back of the first elevator behind the plow, it is obvious that some means must be provided to deflect the ballast broken up by the inner position of the plow, outwardly into a lane or path to be operated upon by the gathering wings of the elevators on the same side of the apparatus. For this purpose there is secured to the bottom end of the front side of the first elevator behind the plow a deflecting plow or mould board 196 which best appears in Figs. 2 and 5. In Fig. 2 six elevators are shown at each side of the car behind or rearwardly of the plow on the same side of the car. In the bottom of said figure the first four plows are shown as in operation with their gathering wings set to gather in different individual portions of the loosened ballast, the last two elevators being shown in the non-operating position with their wings disposed along the front of the casing, it being pointed out that the number of elevators being employed at the same time being dependent upon the condition and type of ballast being worked upon. In the upper portion of Fig. 2 all elevators are shown in the non-operating position with their gathering wings "closed" and with the associated plow-like device 40 disposed in its transverse inoperative position under the associated side of the car.

*Ballast cleaning and separating structure*

At the bottom of each section 39 of the car body is located a horizontally disposed endless belt-like conveyor which appears in dotted lines in Figs. 1 and 2 and which is therein indicated as a whole by the numeral 200. Each conveyor, which is coextensive in length with all of the elevators 125 on the same side of the car, including longitudinally extending spaced side beams 201—201 which are supported on the bolster 14 and lateral supports 112ª of the underframe between the posts 38 and frames 105 on the same side of the car. Each conveyor further includes front and rear end rollers 202—203 (see Fig. 1) about which an endless belt 204 is trained, these rollers being journalled in the beams 201 of the conveyor. The beams of each conveyor also carry supporting rollers 205—206 and which best appear in Fig. 4. The rollers 205 are sectional and are so arranged as to impart a shallow transversely concaved trough formation to the upper lap of the belt which runs toward the front of the car.

It is to be noted from the left hand side of Fig. 4 that when the elevators on the corresponding side of the car are in the "down" or operating position, the streams of foul ballast passing out through the opening 135 of each such elevator is discharged upon the top lap of the belt as indicated in said Fig. 4.

Each conveyor 200 discharges ballast from its front end into the bottom portion of the casing 210 of an upright side by side ballast elevator, these casings being best shown in dotted lines in Fig. 1. In the sides of each casing are journalled transverse shafts upon which are mounted upper and lower sprockets 211–212 about which are trained roller chains 213 that carry flights 214. The structures of the parts mentioned, such as chains, sprockets and flights are similar to those employed in each elevator and therefore need not be illustrated or described in detail at this time for a full understanding thereof.

In the upper portion of each side section 39 is a vibrating ballast shaker and grading screen, each indicated as a whole by the numeral 215. The specific screen structure which is of the longitudinally extending sectional type is illustrated, described and claimed in my copending application for patent Ser. No. 352,505 filed as of even date herewith, now Patent No. 2,779,470 of January 29, 1957. The various sections each include laterally spaced side beams 216, with vetrically spaced upper and lower foraminous plate-like screens 217–218 respectively, the upper plates having the larger openings therein to pass dirt and certain sized rock pieces onto the lower screen which in turn has smaller openings therein for the passage of stone chips and other fouling material therethrough onto a so called "dirt" conveyor below and which will be described in more detail later. Each shaker screen is supported from above by sets of springs 220 from transverse cross arms 221 supported by the posts 38, as best appears in Fig. 4.

The front end of each shaker screen, which is the higher end, is disposed below the upper end of the upright elevators in the casings 210 and receives the ballast discharged from said casings by the elevators therein. The shaker screens pitch or incline downward from the front toward the rear end and which rear end is disposed a sufficient distance above the rear end of the conveyors 200 so as to permit the passage of the before mentioned dirt conveyors between them as best appears in dotted lines in Fig. 1.

Associated with the lower rear end of each shaker screen, and which end is the discharge end thereof, is a duplex chute structure 230 which best appears in Figs. 19, 20 and 21 respectively. Each chute has an inlet end 231 and an outlet end 232, the outlet ends of the chutes facing toward opposite sides of the car as best appears in dotted lines in Fig. 2 and in full lines in Fig. 19. In each chute is a partition 233 which divides the same into upper and lower passageways 234 and 235 respectively. The outer end of the partition 233 at the discharge end of each chute is curved downwardly as at 236 to afford a downwardly opening discharge 237 for the lower passageway and an outwardly opening discharge 238 for the upper passageway.

These chutes are fixed against movement from associated parts of the car. The rear end of each shaker screen extends into the inlet end of an associated chute in such a manner as to be capable of endwise movement therein when such screens are in operation. Thus the cleaned larger pieces of (ballast) rock which is discharged from the upper screen of each shaker 215 is discharged into the inlet end of the upper passageways in the chutes and the cleaned smaller pieces of (ballast) rock discharged from the lower screen of each shaker is discharged into the inlet end of the lower passageways in the chutes. As the chutes are so formed as to afford a "flowing" pitch for the ballast rock pieces discharged into the passageways, such rock pieces will discharge as separate isolated streams out through the discharge 237—238 of the chutes.

*Clean ballast discharge box*

Each chute, as best shown in Fig. 2, opens laterally of the car at a point between the rearmost side elevator and the ballast gathering means and the front end of the rear cab 28 of the car, the discharge ends of each chute being disposed to overhang in part a ballast discharge box 240, one of which best appears in Fig. 22. These boxes are structurally the same but are made "right" and "left," the box shown in said Fig. 22 being the one for the right hand side of the car being the side appearing in Fig. 1.

Each box, which is of a rectangular shape, includes upright outer and inner walls 241—242 and upright front and rear side walls 243 and 244 respectively. The wall 241 extends only a part way down from the top of the box to provide an opening 245 for the discharge of ballast out through the outer side of the box. The opening has associated therewith a door 246, this door being hinged at its top, as at 247, to the lower portion of the wall 241. This door may be swung about the hinges 247 from a position fully closing the opening into different angular open positions, the door being shown in its extreme open position in said Fig. 22. To hold the door in the desired position there is provided on the upper portion thereof a bar 248, the ends of which, beyond the side edges of the door, are bent to form curved arms 249 which are concentric with the axis of the hinge 247. In each arm longitudinally spaced openings 250 are provided through which a wing bolt 251 may be passed for threaded engagement into a plate 252 secured to the associated front and rear walls of the box. Each box also includes an inclined bottom wall 253 which extends from its lower outer end at the front bottom portion of the box to its upper inner end which terminates at the horizontal middle of the inner upright wall 242 of the box. Rising from this wall is an upright partition 254 which divides the opening 245 into a wider and forward large rock piece discharge portion 245a and a smaller and rearward finer rock piece discharge portion 245b. The top edge of the partition terminates short of the top of the box, as best appears in said Fig. 22.

256 indicates a vertical partition which is parallel with the inner wall 242, being spaced outwardly thereof a distance approximating the same as the distance between the walls 244 and partition 254. The vertical partition, which is of a three sided shape, has a bottom edge 257 which meets the top edge of the wall 243 and extends downwardly therefrom to meet the top edge of the partition 254. A bottom wall 258 follows the edge 257 of said portion and coacts therewith in forming an inclined bottom passage 259 which opens into and communicates with the inner upper end of the passage 245b. Between the wall 241 and partition 256 is an inclined wall 260 which is inclined upwardly and rearwardly (of the car) from the top edge of the partition 254 to meet the top edge of the rear wall 244. Thus the partitions 256 and 260 in connection with upper parts of the walls 241—242 form a front top inlet opening 261 which opens into discharge portion 245a.

Each ballast discharge box above described is suitably supported from fixed parts of the car at the sides thereof, below the associated chutes 230 and with the top end of passage 259 below the discharge 237 of the lower passageway in the associated chute so that rock pieces which are in said discharge chute drop into the passage 259, the top end of the passage 261 receiving rock pieces from the discharge end 238 of the upper passageway in the associated chute 234. With the structure described coarser cleaned ballast rock pieces are discharged from the passage 245a in advance of the less coarse rock pieces discharged from the passage 245b. Thus, as the car advances in a ballast cleaning operation the cleaned coarser ballast rock pieces are discharged upon the road bed as a ridge, the less coarser ballast rock being discharged thereupon. If desired to have the smaller pieces of ballast on the bottom it is only necessary to reverse the boxes side for side.

As the rock pieces of the ballast discharged from the boxes and as their travel through the chutes and boxes is quite rapid due to the inclination of the passages they follow, it is necessary that the spread of discharged material be controlled, otherwise the ballast may not be delivered where desired. By adjusting the angular open position of the door the same may be caused to be engaged by the cleaned ballast rock passing from the discharge passages 245a—245b so as to confine such rock to the desired zone for later shaping.

*Dirt disposal conveyors*

Arranged beneath the shaker conveyor screen 215 and arranged at an inclination is a dirt conveyor, the term "dirt" meaning foul material removed from ballast and not suitable or desired for ballast purposes. Such a dirt conveyor is indicated as a whole by the numeral 270, best indicated in dotted lines in Fig. 1. As best shown therein the rear bottom end thereof is disposed under the chutes, and some distance to the rear thereof and to the associated discharge boxes 240.

Each dirt conveyor includes a pair of laterally spaced side channels 271 and at the opposite ends of each pair of said channels are journalled rollers 272—273 about which is trained an endless belt 274. The beams or channels 271 are supported from posts 38 by means of cross arms 275 fixed to said posts. Between the beams of each pair are suitably mounted rollers 276—277 for the support of the upper and lower laps of the belt 274, the upper rollers providing a transverse concaved formation to the upper lap of the belt better to hold the "dirt" discharged thereupon from the shaker screens.

In the rear cab 28 of the car is a power generating unit 280 entirely independent of the unit 31 in the front cab of the car, the main purpose of the front unit 31 being to provide forward and rearward traction or movement for the car and/or other cars which may be coupled thereto. The unit 280 preferably is an internal combustion engine which provides power for driving certain other units (not shown) such as those producing the high pressure mediums for actuating the power cylinders before mentioned and for driving a pair of counter shafts 281 that extend longitudinally of the upper part of the car body as best appear in Fig. 4. From these shafts power is supplied for operating the conveyors 200—215 and for imparting mechanical vibration to the shaker screens, through meshing bevel gears $281^A$ and $281^B$, shaft $281^C$, bevel gears $281^D$ and $281^E$, pulley $281^F$ and belts $281^G$ which are operatively connected to pulleys $281^H$ on the mechanical vibrator $281^V$ mounted on the frame of the vibratory screen 215.

Mounted on the lower rear platform 26 of the car body are the front ends of a pair of dirt discharge conveyors 285—285, there being one of such conveyors for each dirt conveyor 270. Each conveyor includes a pair of side channels 286 and in the front end of each pair of channels is journalled a roller 287 about which the endless belt 288 (see Fig. 8) is trained. This belt is driven by its own unit (not shown) on the rear ends of the conveyor independently of the unit 280.

The front ends of side channels 286 of each conveyor 285 are journalled upon shafts 289—289 supported in the upright arms 290—290 of U-shaped saddles or brackets 291—291, the horizontal bases 292—292 for said brackets engaging on a fixed part 293 of the platform 26, thus providing for a turning movement of the conveyors about vertical axes as by the center pins 294—294. Thus the conveyors can be swung into different angles vertically about the shafts 289—289 and can be swung into different angles horizontally about the pins 294—294. The parts just above described best appear in Figs. 7 and 8.

The front end of each conveyor 285 is provided with an open top hopper 295 (see Figs. 7 and 8) and into which the rear ends of the dirt conveyors 270 discharge. As shown in Fig. 8, the top ends of said hoppers are relatively wide and guide the dirt discharged from said conveyors 270 onto the front end of the conveyors 285.

It is pointed out at this time that the apparatus above described is usually employed as a part of and as the leading car of a train. When so employed, the second car (not shown) of the train is coupled to the rear end of the apparatus or car in the usual manner of car coupling. Such a second car is termed the dirt receiving car of the train.

At times, because of track side conditions, it is not practicable to dump or discharge the dirt removed from the ballast along the road bed as it is currently removed. Under such conditions the dirt must be stored in the dirt car for later discharge, or there may be times when the dirt is desired elsewhere for fill or other purposes. Under such conditions the rear ends of the conveyors 285 are swung upwardly about the shafts 289 to overhang and discharge into said second or "dirt" car.

When track conditions make it practicable and it is so desired to discharge such dirt to the sides of the road bed, the conveyors may be swung about the axis of the pins 294—294 to extend outwardly and away from the respective sides of the car.

With the apparatus constructed as described, the car moves along the track under its own power which as explained is also ample to pull one or more additional cars of a work train in either forward or reverse from one place of use to another. In the forward movement of the car at the working speed and with the parts placed in working position, as heretofore explained, the plow or plows, as the case may be, break and loosen the ballast, which is then picked up by gathering means at one or both sides of the car as desired.

Fig. 26 is a diagrammatic view illustrating the fact that the ballast cleaning apparatus does not foul or obstruct the movement of trains upon the adjacent track. On the right hand track there is shown the ballast conditioning car and on the left hand side the outline of a locomotive 300' in which 301' (shown in dotted lines) are the steam cylinders of the largest type locomotives in service. An elevator on the left hand side of the ballast cleaning car is shown diagrammatically in one position in full lines and in another position in dot and dash lines.

The full lines, dot and dash lines, and dotted lines are intended merely to indicate various relative positions which the cars on adjacent tracks assume as when traveling on straight level tracks, on curves where the super-elevation of the tracks is on the right and also when the super-elevation of the tracks is on the left. It will be understood from the detailed description heretofore given that it is possible and feasible under any or all of these conditions for the ballast conditioning mechanism to operate without fouling or obstructing the adjacent track.

While the guide frames for the ballast pick up elevators have not been indicated in Fig. 26 it is believed the detailed description previously given is amply sufficient to explain the various ways in which these frames may be positioned as may be necessary to meet a wide variety of conditions met with in railroad practice.

The method of Fig. 27

Referring now particularly to Fig. 27 it represents in diagrammatic form a double track railroad from which the ballast may be removed in accordance with one method of the invention and by means of the disclosed apparatus. Therein 300 represents as a whole the ballast, 301 the ties of the right hand track on which the rails 302 are carried, and 303 the ties of the left hand track on which the rails 304 are carried. 305 is the ballast shoulder for the right hand track, 307 the intertrack ballast and 306 the ballast shoulder for the left hand track.

Assume now the ballast is to be removed from the shoulder 305 and a part of the intertrack space adjacent the right hand track. The ballast is removed in a series of stratum-like sections, each of which preferably has a cross section of like size. Thus, if cross sections of such character be removed in an advancing movement along the rails, the volume of ballast so segmentally removed will be approximately the same for each segment. While the method may be practiced in various ways, from the detailed description heretofore given of the apparatus of the present invention, it will be understood such mechanism is well adapted to remove the ballast in such manner, and also to present it to the multiple elevator arrangement where each particular elevator will be able to carry a substantially equal load. Thus, danger of overloading and clogging any one of the elevators is avoided. Likewise, the amount taken in each segment may be nicely adjusted to the particular and varying conditions which obtain along the line where the ballast is being conditioned.

Thus the ballast from the shoulder 305 illustrated in Fig. 27 is indicated as being removed in the form of four vertical segments 310, 311, 312 and 313 as shown by the vertical dotted division lines.

Referring to the intertrack space the ballast is indicated as being removed in the form of five vertical segments 314, 315, 316, 317 and 318 respectively, as shown by the dotted lines, as there would normally be more ballast in such a cross sectional area than there would be in the shoulder cross section. Hence, in this way it is possible to maintain the desired characteristic of removing substantially the same amount of material in each segmental cut.

One of the particular advantages of this method of procedure resides in the fact that track ballast may be conditioned efficiently on a mass production basis utilizing apparatus which can progress at relatively rapid speed along the track, thereby reducing to a minimum the amount of time during which the track is held out of service.

The method of Fig. 28

Referring now to Fig. 28, this is a diagrammatic view similar to Fig. 27. To corresponding parts like reference characters have been applied. The difference between the two illlustrated methods resides in the fact that the method of Fig. 27 depicts removal of vertical stratum-like sections, whereas Fig. 28 illustrates removal of horizontally disposed stratum-like sections. Thus from the shoulder 305 the various stratum-like sections are illustrated as being divided by the horizontal divided lines, dividing the sections 320, 321, 322 and 323. It will, of course, be understood that these sections are removed in succession, starting with the uppermost section 323.

The various sections 320 to 323 inclusive, are intended to have areas which in vertical cross-section are substantially equal, as is the case with the various sections or cuts as removed in Fig. 27.

The mass of ballast from the inner track space is likewise removed along the dotted lines, thus dividing the ballast into stratum-like layers, numbered respectively 324, 325, 326, 327 and 328. It is intended that the cross-sectional vertical area of each layer shall be substantially the same and preferably also substantially the same as the area of any particular vertical subdivision, as removed from the shoulder 305. Since generally the amount of ballast to be removed from the intertrack space would be slightly more than would be removed from a section of the shoulder, it normally would be preferable to remove the intertrack ballast by means of a larger number of cuts or layers. Hence it will be observed that there are five layers of indicated removal in the intertrack space as compared with four in the shoulder section.

The method may be practiced in various ways, but the mechanism disclosed in the present application may be advantageously used in the performance of the described method.

The method of Fig. 29

The method illustrated in Fig. 29 is somewhat similar to the methods illustrated in Figs. 27 and 28. The difference lies in the particular manner in which the masses of ballast are removed from the shoulder and intertrack space respectively.

Referring first to the shoulder 305, the mass of ballast is initially removed from the upper inner corner, as indicated at 330. Thereafter successive sections are removed as indicated at 331, 332 and 333.

It is intended that the cross-sectional area of each of the areas defined by the dotted line shall be substantially equal so that in any advancing movement along the track substantially equal volumes of ballast will be removed from each defined area.

Referring to the intertrack space, the ballast likewise is removed in a somewhat similar manner starting first with a section 334 and then successively removing sections 335, 336, 337 and 338. As in the cases of the other methods the aim is to remove substantially equal amounts of ballast from each of the segmental or defined areas.

The disclosed apparatus and method therefore makes possible what has long been sought and that is an on the track ballast conditioning apparatus having such flexibility of operation that it is possible to meet the great many varying conditions encountered along the railroad and yet condition or clean the ballast adequately and on a mass production basis. Also it becomes feasible to accomplish what has long been sought but seldom if ever accomplished in railroad practice and that is the periodic conditioning of the ballast at sufficiently frequent intervals as to maintain the effective drainage conditions of the ballast upon which the safety, speed, riding characteristics and the like of the trains so vitally depend.

I claim as my invention:

1. A railway ballast conditioning apparatus embodying therein a railroad car having wheels for supporting it for operation along a railroad, a ballast pick up elevator having an intake adjacent the lower end thereof and means mounting the elevator for movement as a whole in a generally upright inwardly inclined rectilinear path, at one side of the car, from a lower operative ballast engaging position to a higher inoperative position.

2. A railway ballast conditioning apparatus embodying therein a railroad car having wheels for supporting it for operation along a railroad, a ballast pickup elevator having an intake adjacent the lower end thereof and means mounting the elevator for movement as a whole in a generally upright inwardly inclined rectilinear path, at one side of the car, from a lower operative ballast engaging position to a higher inoperative position, and regulatable means for causing such movement.

3. A railway ballast conditioning apparatus embodying therein a railroad car having wheels for supporting it for operation along a railroad, a ballast pick up elevator having an intake adjacent the lower end thereof and means mounting the elevator for movement as a whole in a generally upright inwardly inclined rectilinear path, at one side of the car, between a lowermost operative ballast engaging position and a higher inoperative position, and means for selectively placing the elevator intake end in a plurality of different ballast working elevations.

4. A railway ballast conditioning apparatus embodying therein a railroad car having wheels for supporting it for operation along a railroad, a ballast pick up elevator having an intake adjacent the lower end thereof and means mounting the elevator for movement as a whole in a generally upright inwardly inclined rectilinear path, at one side of the car, from a lower operative ballast engaging position to a higher inoperative position, and means for changing the angularity of the elevator path to the vertical.

5. A railway ballast conditioning apparatus embodying therein a railroad car having wheels for supporting it for operation along a railroad, a ballast pick up elevator, means for mounting said elevator in a generally upright position at one side of the car, said elevator having casing means providing a substantially tubular enclosure, said enclosure having an intake opening adjacent its lower end and a discharge opening adjacent its upper end, said intake opening being on one side of the casing and the discharge opening on another side, both the intake and discharge openings being located in planes substantially parallel to the direction of car movement.

6. A railway ballast conditioning apparatus embodying therein a railroad car having wheels for supporting it for operation along a railroad, a ballast pick up elevator, means for mounting said elevator in a generally upright position at one side of the car, said elevator having casing means providing a substantially tubular enclosure, said enclosure having an intake opening adjacent its lower end and a discharge opening adjacent its upper end, said intake opening being on the outer side of the casing and the discharge opening on the inner side, both the intake and discharge openings being located in planes substantially parallel to the direction of car movement.

7. The arrangement set forth in claim 6, in which one wall of the casing comprises a plurality of overlapping hinged sections, each adapted to yield when subjected to pressure beyond a predetermined amount.

8. Apparatus for conditioning a mass of foul railroad ballast lying along and beyond the ends of the ties in a zone of predetermined width and depth, embodying therein a railroad car having wheels for supporting the same for operation along a railroad track, a plurality of ballast pick up elevators positioned along at least one side of the car, means forming a casing enclosing each elevator, each casing having a ballast receiving opening adjacent the lower end thereof, said opening being located in a plane substantially parallel to the direction of car movement, each elevator having a ballast pick up means adjacent the lower end thereof, and means selectively operable to arrange the pick up means of the individual elevators so that whilst the car advances along the track the individual elevators will each remove a portion of said mass, each portion in vertical section comprising a cross sectional area less than that of the vertical cross sectional area of the ballast mass in the zone to be removed.

9. Apparatus for conditioning a mass of foul railroad ballast lying along and beyond the ends of the ties in a zone of predetermined width and depth, embodying therein a railroad car having wheels for supporting the same for operation along a railroad track, a plurality of ballast pick up elevators positioned along at least one side of the car, each elevator having a ballast pick up means adjacent the lower end thereof, and means selectively operable to arrange the pick up means of the individual elevators so that whilst the car advances along the track, the foremost elevator removes a portion of the ballast mass disposed in the upper inner corner of the vertical cross sectional area of the mass in the zone to be removed and the remainder is removed by at least one following elevator.

10. Apparatus for conditioning a mass of foul railroad ballast lying along and beyond the ends of the ties in a zone of predetermined width and depth, embodying therein a railroad car having wheels for supporting the same for operation along a railroad track and comprising the following mechanisms all operatively carried by the car, a ballast breaking plow-like device for breaking at least the major part of the ballast in said zone, a plurality of ballast pick up elevators positioned along at least one side of the car all rearwardly of said plow-like device, each elevator having a ballast pick up means adjacent the lower end thereof, and means selectively operable to arrange the pick up means of the individual elevators so that whilst the car advances along the track the individual elevators will each remove a portion of said mass, each portion of which in vertical section comprises a cross sectional area less than that of the vertical cross sectional area of the ballast mass in the zone to be removed.

11. Apparatus for conditioning a mass of foul railroad ballast lying along and beyond the ends of the ties in a zone of predetermined width and depth, embodying therein a railroad car having wheels for supporting the same for operation along a railroad track and comprising the following mechanisms all operatively carried by the car, a ballast breaking plow-like device for breaking all of the ballast in said zone, a plurality of ballast pick up elevators positioned along at least one side of the car all rearwardly of said plow-like device, each elevator having a ballast pick up means adjacent the lower end thereof, and means selectively operable to arrange the pick up means of the individual elevators so that whilst the car advances along the track the individual elevators will each remove a stratum-like portion of said mass, each portion of which in vertical section comprises a cross sectional area less than that of the vertical cross sectional area of the ballast mass in the zone to be removed, and means for propelling the car along the track.

12. Apparatus for conditioning a mass of foul railroad ballast lying along and beyond the ends of the ties in a zone of predetermined width and depth, embodying therein a railroad car having wheels for supporting the same for operation along a railroad track and comprising the following mechanisms all operatively carried by the car, a ballast breaking plow like device for breaking the ballast in said zone, a plurality of ballast pick up elevators positioned along at least one side of the car rearwardly of said plow-like device, each elevator having a ballast pick up means adjacent the lower end thereof, and means selectively operable to arrange the pick up means of the individual elevators so that whilst the car advances along the track, the foremost elevator will remove a portion of the ballast mass disposed in the upper inner corner of the vertical cross sectional area of the mass in the zone to be removed and the remainder will be removed by at least one following elevator.

13. Apparatus for conditioning a mass of foul railroad ballast lying along and beyond the ends of the ties in a zone of predetermined width and depth, embodying therein a railroad car having wheels for supporting the same for operation along a railroad track and comprising the following mechanisms all operatively carried by the car, a ballast breaking plow-like device for breaking the ballast in said zone, a plurality of ballast pick up elevators positioned along at least one side of the car, rearwardly of said plow-like device, each elevator having a ballast pick up means adjacent the lower end thereof, and means selectively operable to arrange the pick up means of the individual elevators so that whilst the car advances along the track, the foremost elevator will remove a portion of the ballast mass disposed in the upper inner corner of the vertical cross sectional area of the mass in the zone to be removed and the remainder will be removed by a plurality of following elevators.

14. In a railway ballast conditioning apparatus, a foul ballast pick up and moving means, comprising a generally upright casing having opposed sides and a front and a back, and closed at the top and bottom ends, the back including a wall having a ballast discharge opening at its top end, the front having a ballast inlet opening above said closed bottom end, a partition in said casing and extending between the opposed sides, and forming front and rear passages in the casing that are connected at their top and bottom ends, spaced about flanges mounted on the opposed sides of the casing and forming endless conveyor chain tracks therein, upper and lower shafts journalled in said opposed sides, sprockets on said shafts, an endless chain of connected links disposed in each track and trained about said sprockets and flights extending between selected links of each chain, motor means on the top end of the casing, and means for driving said upper shaft from said motor means.

15. In a railway ballast conditioning apparatus including a railroad car for travel along the tracks of a railroad and having the following means carried thereby, a foul ballast pick up and moving means, comprising a generally upright casing having opposed sides and a front and a back, and closed at the top and bottom ends, the back including a wall having a ballast discharge opening at its top end, the front having a ballast inlet opening above said closed bottom end, wings spaced laterally from said closed bottom end of said front for gathering ballast to a point above the closed bottom end of the front for spillage thereover into said casing, and means in said casing for elevating ballast from the bottom of the casing and to said discharge opening.

16. In a railway ballast conditioning apparatus including a railroad car for travel along the tracks of a railroad and having the following means carried thereby, a foul ballast pick up and moving means, comprising a generally upright casing having opposed sides and a front and a back, and closed at the top and bottom ends, the back including a wall having a ballast discharge outlet at its top end, the front having a ballast inlet opening above said closed bottom end, said front having an open portion above said inlet opening, conveyor means in said casing for elevating ballast entering said inlet and for discharging the same out through said outlet, closure means for said open portion of the front of said casing above said inlet, and means for mounting said closure means on said casing for floating movement away from and toward the casing to accommodate oversize pieces of ballast on said conveyor means.

17. In a railway ballast conditioning apparatus, a foul ballast pick up and moving means, comprising a generally upright casing having opposed sides and a front and a back, and closed at the top and bottom ends, the back including a wall having a ballast discharge outlet at its top end, the front having a ballast inlet opening above said closed bottom end, said front having an open portion above said inlet opening, conveyor means in said casing for elevating ballast entering said inlet and for discharging the same out through said outlet, closure means for said open portion of the front of said casing above said inlet, said closure means comprising a plurality of plate like members arranged end to end along the front of the casing and link like members connecting the upper ends of said plate like members with said casing and permitting an outward movement of said plate like members relative to the casing to accommodate oversize pieces of ballast on said conveyor means.

References Cited in the file of this patent

UNITED STATES PATENTS

| | | |
|---|---|---|
| 865,261 | Mehaffey | Sept. 3, 1907 |
| 1,272,655 | Gawlet | July 16, 1918 |
| 1,361,294 | Tschache | Dec. 7, 1920 |
| 1,831,483 | Dobbins et al. | Nov. 10, 1931 |
| 1,860,415 | Hanlon | May 31, 1932 |
| 1,953,100 | Blaisdell | Apr. 3, 1934 |
| 1,953,979 | Speno | Apr. 10, 1934 |
| 2,003,606 | Protzeller | June 4, 1935 |
| 2,020,013 | Bailey | Nov. 5, 1935 |
| 2,022,150 | Protzeller | Nov. 26, 1935 |
| 2,142,208 | Protzeller | Jan. 3, 1939 |
| 2,196,880 | Van Voorhis et al. | Apr. 9, 1940 |
| 2,231,177 | Banton | Feb. 11, 1941 |
| 2,252,304 | Overtrow et al. | Aug. 12, 1941 |
| 2,272,429 | Philbrick | Feb. 10, 1942 |
| 2,284,035 | Blair | May 26, 1942 |
| 2,298,153 | Overtrow et al. | Oct. 6, 1942 |
| 2,300,017 | Shaffer | Oct. 27, 1942 |
| 2,549,990 | Skelton | Apr. 24, 1951 |
| 2,616,192 | Philbrick | Nov. 4, 1952 |
| 2,624,129 | Steece | Jan. 6, 1953 |
| 2,775,438 | Bach et al. | Dec. 25, 1956 |

FOREIGN PATENTS

| | | |
|---|---|---|
| 722,449 | France | Dec. 29, 1931 |
| 871,767 | Germany | Mar. 26, 1953 |